(12) United States Patent
Laydera-Collins

(10) Patent No.: US 11,903,339 B1
(45) Date of Patent: *Feb. 20, 2024

(54) EXTERNALLY WINDABLE TRIMMER HEAD

(71) Applicant: Imack Laydera-Collins, Benton, LA (US)

(72) Inventor: Imack Laydera-Collins, Benton, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/121,170

(22) Filed: Mar. 14, 2023

Related U.S. Application Data

(63) Continuation-in-part of application No. 17/981,751, filed on Nov. 7, 2022, now Pat. No. 11,632,903.

(60) Provisional application No. 63/414,597, filed on Oct. 10, 2022.

(51) Int. Cl.
*A01D 34/416* (2006.01)

(52) U.S. Cl.
CPC ...... *A01D 34/4163* (2013.01); *A01D 34/4166* (2013.01)

(58) Field of Classification Search
None
See application file for complete search history.

(56) References Cited

U.S. PATENT DOCUMENTS

| | | | | |
|---|---|---|---|---|
| 2,429,675 A | * | 10/1947 | Eypper ................ | H02G 11/02 242/601 |
| 3,708,967 A | * | 1/1973 | Geist ................ | A01D 34/4161 56/295 |
| 3,826,068 A | * | 7/1974 | Ballas ................ | A01D 34/416 56/295 |
| 4,054,992 A | * | 10/1977 | Ballas ................ | A01D 34/4168 30/276 |
| 4,097,991 A | * | 7/1978 | Proulx ................ | A01D 34/416 30/276 |
| 4,145,809 A | * | 3/1979 | Proulx ................ | A01D 34/416 30/276 |
| 4,172,322 A | * | 10/1979 | Ballas ................ | A01D 34/4165 30/276 |
| 4,412,382 A | * | 11/1983 | White, III ......... | A01D 34/4163 30/276 |

(Continued)

*Primary Examiner* — Hwei-Siu C Payer

(57) ABSTRACT

The cutting head assembly object of the present invention comprises a trimmer line feed mechanism and a trimmer line winding mechanism. A lower cover member coupled to the housing member and has a central opening to hold a ground engaging button member. The ground engaging button member is rotationally engaged to the spool and a lower cover. The upper section of the ground engaging button member and the internal walls of the cover ring have radially and axially extending structures which cooperate with each other to provide a ratcheting and indexing mechanisms that allows controlled rotation of the spool which is constrained from axial movement relative to the head enclosure by biasing the force of a compression spring which also maintains the ground engaging member in an extended position. The winding mechanism allows to manually turn the knob in one direction while the indexing mechanism allows to control rotational increments of the knob to allow the spool to release controlled increments of line when the ground engaging member is bumped against the ground and to stop rotation of the spool during normal running position.

21 Claims, 17 Drawing Sheets

(56) References Cited

U.S. PATENT DOCUMENTS

| | | | | |
|---|---|---|---|---|
| 4,458,419 A * | 7/1984 | Proulx | A01D 34/4163 30/276 |
| 4,490,910 A * | 1/1985 | Mattson | A01D 34/416 30/276 |
| 4,672,798 A * | 6/1987 | Ota | A01D 34/4163 30/276 |
| 4,685,279 A * | 8/1987 | Gullett | A01D 34/416 30/276 |
| 4,756,146 A * | 7/1988 | Rouse | A01D 34/4166 30/276 |
| 4,823,465 A * | 4/1989 | Collins | A01D 34/4163 30/276 |
| 4,835,867 A * | 6/1989 | Collins | A01D 34/4162 30/276 |
| 5,657,542 A * | 8/1997 | White, III | A01D 34/4163 30/276 |
| 5,659,960 A * | 8/1997 | Everts | A01D 34/4163 30/276 |
| 5,758,424 A * | 6/1998 | Iacona | A01D 34/4166 30/276 |
| 5,765,287 A * | 6/1998 | Griffini | A01D 34/4163 30/276 |
| 5,806,192 A * | 9/1998 | Everts | A01D 34/4163 30/276 |
| 6,148,523 A * | 11/2000 | Everts | A01D 34/4163 30/276 |
| 6,851,191 B2 * | 2/2005 | Arnetoli | A01D 34/4163 30/276 |
| 6,854,185 B1 * | 2/2005 | Alliss | A01D 34/4161 30/276 |
| 6,952,877 B2 * | 10/2005 | Pfaltzgraff | A01D 34/4163 30/276 |
| 7,412,768 B2 * | 8/2008 | Alliss | A01D 34/4161 30/276 |
| 7,513,046 B2 * | 4/2009 | Proulx | A01D 34/416 30/276 |
| 11,470,772 B2 * | 10/2022 | Zenkus | B29C 45/0046 |
| 11,632,903 B1 * | 4/2023 | Laydera-Collins | A01D 34/4163 30/276 |
| 2017/0347523 A1 * | 12/2017 | Alliss | A01D 34/4161 |
| 2018/0020614 A1 * | 1/2018 | Alliss | A01D 34/4163 30/276 |
| 2018/0098492 A1 * | 4/2018 | Guo | A01D 34/4166 |
| 2019/0185289 A1 * | 6/2019 | Alliss | A01D 34/4166 |

* cited by examiner

EXTERNALLY WINDABLE TRIMMER HEAD

CROSS REFERENCE TO RELATED APPLICATIONS

This application claims the benefit of the U.S. Provisional Application 63/414,597 filed on Oct. 10, 2022 entitled EXTERNALLY WINDABLE TRIMMER HEAD, which is incorporated herein as a reference. This application is also a continuation in part of the U.S. patent application Ser. No. 17/981,751 filed on Nov. 7, 2022, now U.S. Pat. No. 11,632,903. Copy of the referenced Non Provisional Patent Application is incorporated herein as reference.

BACKGROUND OF THE INVENTION

1.—Field of the Invention

In general, the present invention relates to string trimmers and the rotating heads of string trimmers. More particularly, the present invention relates to the mechanisms contained within string trimmer heads for winding, holding and dispensing new lengths of trimmer line when needed.

2.—Prior Art Description

String trimmer machines have been commercially sold for almost 50 years. In this period of time, there have been many variations to the design of the trimmer head, the line feeding mechanism and the way trimmer line is replaced.

Since the invention of the flexible filament trimmer by G. Ballas in the early 70's the trimmer head have gone through many cycles of improvements. These improvements has been made having as a driver the convenience for use and operate. Most of these improvements were focused on the easy of line dispensing and replacing the filament line onto the head. As an example following Ballas invention, which wasn't too user friendly at the time, manufacturer's implemented the Tap-n-go system which added convenience of operation, exemplary patents are U.S. Pat. No. 4,047,299 by Bair, U.S. Pat. No. 4,663,588 by Pittinger. The Tap-n-go system consists in a head having an internal mechanism that allows to lock the spool containing the trimmer line during operation, and by tapping the head against the ground the internal mechanism allows a partial rotation of the spool to dispense trimmer line as the line wears out. The Tap-n-go system has been very successful and currently it is still in use on many trimming heads in the market. The primary problem associated with such traditional trimmer heads is trimmer line reloading, in order to replenish and reload new trimmer line into the trimmer head, the trimmer head must typically be disassembled and the internal spool removed. Replacement trimmer line is manually wound onto the spool, then threading the line end through the eyelets and closing the assembly.

This process is often too difficult for many homeowners to complete successfully or even attempt. As manufacturer's sought a competitive advantage to increase their market share, improvements kept on evolving and the ease of line replacement issue was yet a problem to be resolved. Among these improvements manufacturer's devised systems as pre-wound spools, easy accessible reducing internal parts, longer lasting filament line and fixed flails. These improvements weren't yet too appealing to users. The second greatest milestone in the evolution of the Tap-n-go head came when in 1998 the U.S. Pat. No. 5,765,287 was published on an invention for an externally windable trimmer head by the Italian inventor named Alberto Griffini, which presented the idea of winding the replacement line onto the spool without opening the head assembly. His invention utilized the same early technology of the Tap-n-go head and by modifying the shape of the internal indexing mechanism into the combination of a ratcheting system to manually wind the replacement line onto the spool and the traditional indexing system. Griffini's invention weren't not totally perfect nor cost effective, but represented a big step towards trimmer line cutting heads evolution. Shortly after Griffini's patent publication, many inventors were primed by his concepts and following his lead a new collection of externally windable heads appeared in the market. Examples are the U.S. Pat. No. 6,952,877 by Pfaltzgraff and U.S. Pat. No. 6,854,185 by Alliss.

All these inventions following Griffini's idea have found a common problem which is the routing of the trimmer line through the spool core, mainly when a trimmer machine longer shaft presented obstacles to feed the new trimmer line straight across the spool. Many have added extra parts to accommodate the necessary passages to guide the line through the spool core and others have implemented alternate routings to overcome such issues and to avoid infringement of existing in-force patents. The common denominator on all current trimmer heads with the feed trough system is the use of the Tap-n-go system to dispense line and therefore the spool is generally moving axially relative to the head. Due to this commonality, the elements that control the spool rotation have to be re-arranged or modified to allow the trimmer line to cross the spool core. This chore becomes even more difficult when the bolt attaching the head to the trimmer machine is very long and crosses through the center of the spool making the trimmer line channels curving around the center of the spool.

As the skilled in the art may recognize, the mechanism for releasing the trimmer line is usually the first part of a string trimmer machine that fails to work do to jamming or line binding inside the spool. A need therefore exists for a string trimmer head that has an inexpensive yet reliable mechanism for dispensing trimmer line when needed. Furthermore, a need exists for a trimmer head that does not have to be disassembled to have new string added. Lastly, a need exists for a trimmer head that can be manufactured inexpensively with few operating parts and can operate on many of the trimmer machines in the market, either as a uni-directional or bi-directional trimmer head. These needs are met by the present invention as described and claimed below.

SUMMARY OF THE INVENTION

The present invention is for an externally windable trimmer head assembly and the method of configuring the trimmer head assembly. The trimmer head assembly attaches to a string trimmer machine. The trimmer head assembly holds lengths of flexible filament line that cuts vegetation when the trimmer head assembly spins and contacts the vegetation. The trimmer head assembly has a housing that attaches to the string trimmer machine. A spool is provided inside the housing. The spool rotates about a common axis of rotation, and does not move axially along the axis of rotation. A ratcheting mechanism and an indexing mechanism are provided between the trimmer head lower cover and the bumping knob. When the bumping knob is in its normal extended position, during operation, the spool is locked. When line feeding is needed, very similar to many tap-n-go models, the head is bumped against the ground while rotating at high speed, this allows the bumping knob to move into a retracted position, which disengages the rotation control elements for locking the spool and engages the indexing system which allows a partial rotation of the spool for feeding a predetermined amount of trimmer line. Once the bumping knob is released from ground contact, the ground bumping knob returns to the extended position to engage the rotation control elements for locking the spool rotation. During this motion, the spool is allow to rotate another angular increment and an additional segment of trimmer line is released. In its lower position the rotation control elements becomes a ratcheting mechanism which enables the spool to discretely rotate about the axis of rotation in the direction opposite in which the spool is allow to rotate inside the trimmer head assembly to dispense line. Using the ratcheting mechanism, new trimmer line can be wound onto the spool, simply by passing the line through the trimmer head and winding the spool manually. No disassembly is required. Preferably the string line can be fed straight through from one eyelet to the other eyelet prior to winding the line onto the trimmer core. When designing the various embodiments for the present invention, keeping in mind the manufacturing process for each components is paramount to maintain functionality and to keep the cost at a minimum since complex components may require multiple subassemblies or intricate plastic molding dies which eventually drives the manufacturing cost upwards.

As the skilled in the art will recognize and learn from the aforementioned description is that the externally windable trimmer head object of the present invention, provides the same function of many externally windable trimmer heads from the prior art, but in essence, the components to provide the function are simplified and in less numbers than many of such competitive forms of prior art. In a nutshell, the basic distinction that sets this invention apart from the prior art is the form in which the spool is maintained axially fixed into the housing with no indexing or ratcheting features and no axially motion against a portion of the housing assembly. This configuration allows to simplify the trimmer line routing through the spool, reduction of internal friction and the relocation of the winding and indexing elements to other than the spool and the housing for a better control and simplified manufacturing. It is therefore an object of the invention to provide improved elements and arrangements thereof in an apparatus for the purposes described which is inexpensive, dependable and fully effective in accomplishing its intended purposes.

Since the operation of dispensing line by the spool is independent of the trimmer head rotation, the trimmer head of the present invention could be used on line trimmer apparatuses with right handed threads drive shaft for clockwise rotation shaft or left handed threads drive shaft for counter clockwise rotation. In a bump-activated trimmer head, the centrifugal force over the flexible filament line overcomes the frictional forces on the spool to allow it to rotate in predetermined steps in a direction of rotation to release an amount of flexible filament line. These and other objects of the present invention will be readily apparent upon s review of the following detailed description of the invention and the accompanying drawings.

BRIEF DESCRIPTION OF THE DRAWINGS

FIG. 10C is a cross sectional view through the spool core above one of the flanges of a single or double chambered spool

DETAILED DESCRIPTION OF THE INVENTION

Figure 1A:
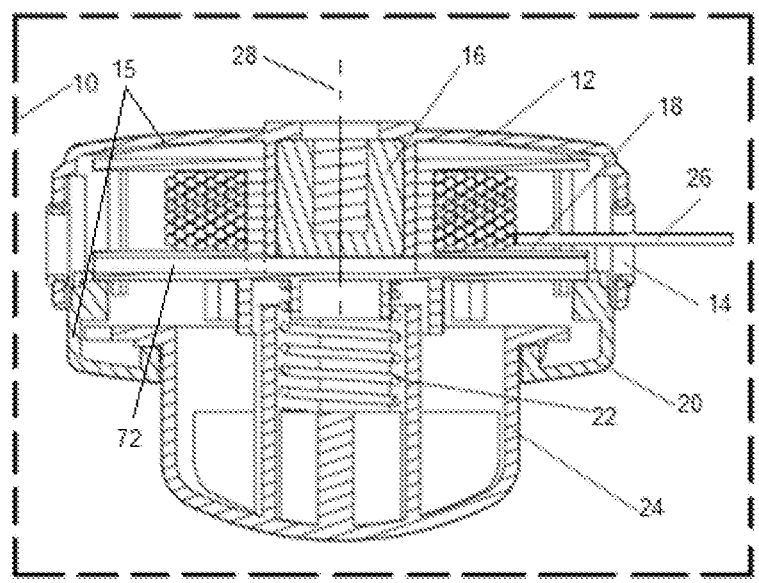
FIG. 1A is a cross-sectional view of a trimmer head according to a first embodiment of the invention displaying the basic elements of the trimmer head assembly.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

As used herein, the terms "a" or "an" are defined as one or more than one. The term "plurality," as used herein, is defined as two or more than two. The term "another" as used herein, is defined as at least a second or more. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including," "having," or "featuring," as used herein, are defined as comprising (i.e., open language). The term "coupled," as used herein, is defined as connected, although not necessarily directly, and not necessarily mechanically. The term "angularly spaced" means that the referred elements are equidistant over a circumference and have equal angular separation. The term "radially equidistant" means that the referred element were included within a similar circle of equal diameter. The term "windable" means able to be wound. The term "alignable" means able to be aligned or centered in relation to a second object. The term "circumferentially equidistant" means that the referred members share the same circumference. The term "axis of rotation" means an imaginary axis in which the referred element rotates around concentrically. The term "rotatively" means able to rotate around a rotation axis. The term "slidable" means that the object in reference is able to freely move around a second object. The term slope is defined as the angular dimension of an inclined plane relative to a horizontal plane relational terms such as first and second, top and bottom, right and left, inner or outer and the like may be used solely to distinguish one entity or action from another entity or action. Without necessarily requiring or implying any actual such relationship or order between such entities or actions. When using "bottom" or "top" to describe elements features, the orientation of such elements is such that when described it is assumed to be in the normal position for operation. Particularly in the head assembly of the present invention, the head assembly is oriented with a vertical axis of rotation and having the coupling elements at the very top of the assembly. The word "cylindrical" means a body or part of a body or element having two end faces perpendicular to an axis of rotation and a cylindrical surface concentric to the axis of rotation. Example of a "cylindrical" body is a disc, where the distance of the end faces may be near zero. As the skilled in the art may recognize, most of the components on the trimmer head object of the present invention are described as "cylindrical" but in practice "cylindrical" also may take the form of "polygonal prisms" without deviating from the spirit of the present invention. The word "bidirectional" means that the externally windable trimmer head of the present invention could be used on driving machines having shafts with clockwise rotation or counterclockwise rotation since the internal configuration of the cutting head is not dependent on the mode of rotation for proper function. The trimmer head assembly will be referred indistinctly as the trimmer head or the trimmer head assembly.

Described now are exemplary embodiments of the present invention. With reference to FIGS. 1A, FIG. 1B, FIGS. 2 and 3B, an exemplary embodiment of an externally windable trimmer head 10 exemplifying the principles of the invention is depicted. The externally windable trimmer head 10 of the present invention is comprised of four basic elements: A head enclosure 15 comprised of a housing assembly 12 and a lower cover 20, a spool 18, a bumping knob 24 and a compression spring 22. The housing assembly 12 includes a housing 13, a keyed threaded coupling 16 and eyelets 14. FIG. 1A depicts a head assembly 10 with trimmer line 26 wound into a single chambered spool 18. A straight through trimmer line guide passage 72 is shown crossing diametrically through the spool 18.

Figure 1B:
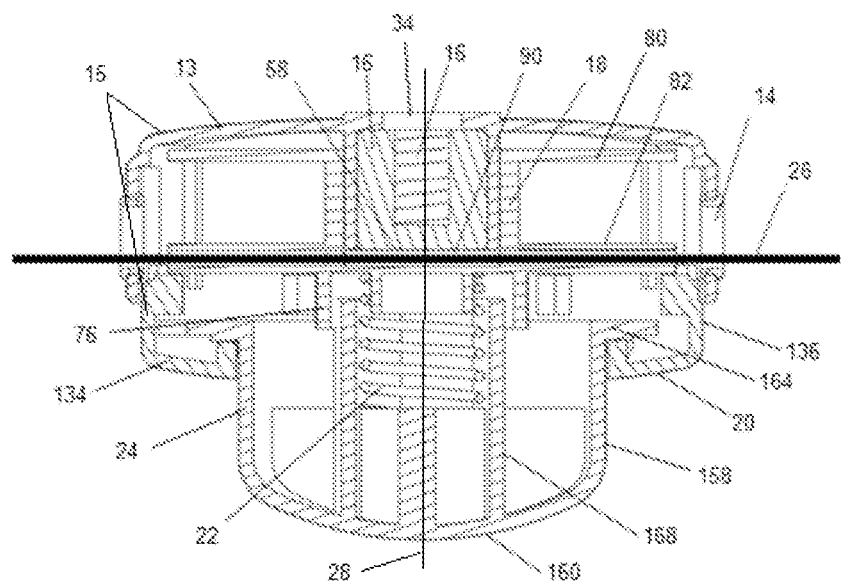
FIG. 1B is a cross sectional view of a trimmer head assembly according to a first embodiment of the invention showing a section of trimmer line threaded through the assembly.

FIG. 1B, depicts a cross sectional view of the head assembly 10 with a trimmer line 26 threaded through the trimmer line guide passage 72 along with other internal elements which will be described further in this detailed description of the invention.

Figure 2:
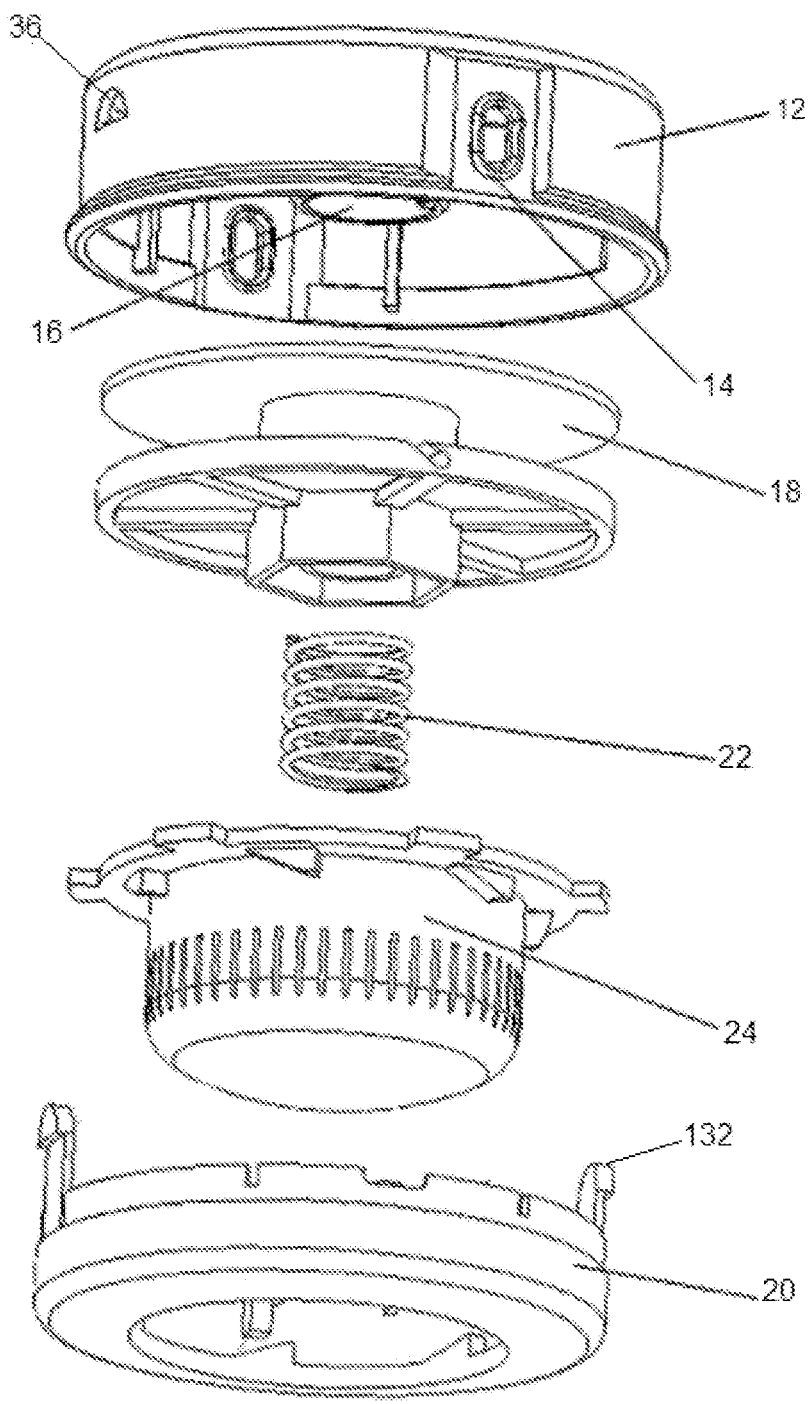
FIG. 2 is an exploded view showing the components of the trimmer head assembly object of the present invention.

FIG. 2 depicts an isometric exploded view of the components of the trimmer head 10. The trimmer head 10 affixes to a string trimmer machine drive shaft arbor (not shown) by a keyed threaded coupler 16 through a housing center hole 34 (Shown by FIG. 3B). The keyed threaded coupler 16 is interchangeable to adapt to the configuration of the drive shaft arbor (not shown) of the trimmer machine since different manufacturers of these machines provide different shaft arbor sizes, thread modulus and thread direction. Typically, the direction of threading of the keyed threaded coupler 16 is selected so that during normal rotation of the drive shaft, the keyed threaded coupler 16 will tend to tighten against the rotational resistance of the trimmer head 10, rather than loosen from the drive shaft arbor. The keyed threaded coupler 16 in cooperation with the head enclosure 15, allows the trimmer head 10 to rotate as a unit with the string trimmer machine drive shaft to drive a trimmer line 26 in a radius outwardly from the trimmer head 10. Resilient tabs 132 in cooperation with the housing locking apertures 36 provide a releasable attachment system of the lower cover 20 to the housing assembly 12. This method for locking the housing assembly 12 with the cover 20 to provide a functional and reliable head enclosure 15 is only use for illustrative purposes since many other locking systems well known by the prior art may be utilized without departing from the spirit of the present invention. All the elements contained within the trimmer head 10 rotate around an axis of rotation 28 (FIG. 1A). For descriptive purposes the trimmer head axis of rotation 28 is common for all components rotationally disposed within the trimmer head 10. The flexible trimmer line 26 is well known in the art as a flexible filament made of plastic or other flexible material available in a number of filament diameters and it is rotated at a high speed to cut grass, weeds or brush that the trimmer line 26 comes in contact with.

Depicted by FIG. 1B is the trimmer head assembly 10 of the present invention comprised of a spool 18 for storage of flexible trimmer line 26, the trimmer line 26, which extends outside the head enclosure 15, rotates at high speed for cutting vegetation, the spool 18 is rotationally disposed within the head enclosure 15 and is axially coupled to a bump knob 24 which is secured to the head enclosure 15 by a lower cover 20. The lower cover 20 is rotationally and axially releasably locked to the housing assembly 12 for holding the trimmer head 10 components in place. A spring 22 maintains the knob 24 engaged to the lower cover 20 and urges the spool to be constrained to a single rotational plane within the head enclosure 15. The knob 24 is rotationally and axially movable within the lower cover 20.

Figure 3A:
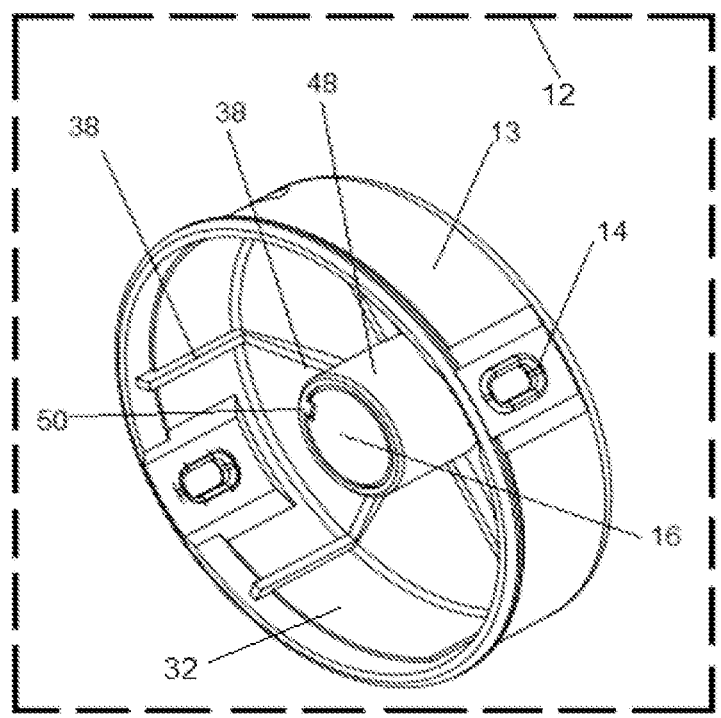
FIG. 3A is an isometric view showing the housing assembly and its basic components.
Figure 3B:
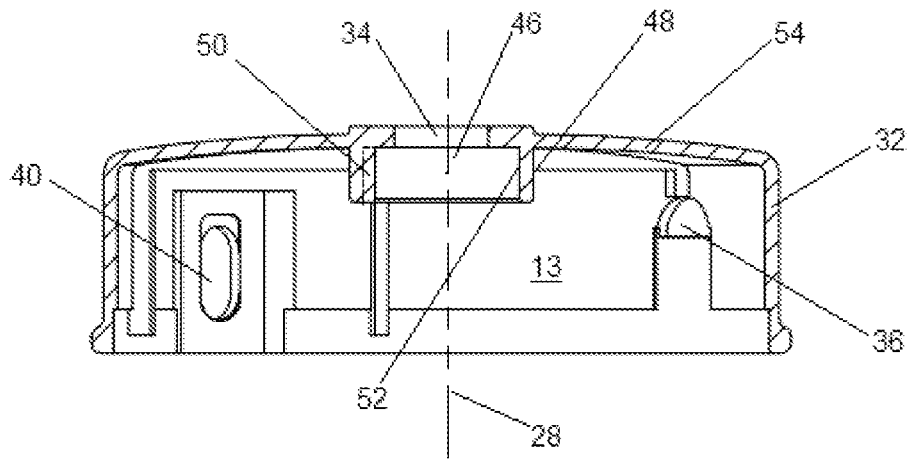
FIG. 3B is a cross sectional view showing the housing assembly and its components.

Referring to FIG. 3A showing a housing assembly 12. The housing assembly 12 including the housing 13, the keyed threaded coupler 16 and the eyelets 14. As shown by FIG. 3B, the housing 13 includes a housing central annular pocket 46 delimited by walls 52 projecting concentrically to the trimmer head axis of rotation 28 to receive the keyed threaded coupler 16 which prevents the keyed threaded coupler 16 from rotating relative to the housing 13 by means of a key 50 projecting radially inwards from the central annular pocket inner wall 52 nested into a groove (not shown) of the keyed treaded coupler 16 cylindrical surface. The central annular pocket inner wall 52 is shown as being cylindrical with a key 50 for descriptive purposes, but different shapes and features such as splines, polygonal, threaded, etc., may be chosen to accommodate a variety of keyed threaded coupler 16 configurations to secure the housing 13 to the trimmer machine arbor (not shown) through the housing center hole 34 in a way that the chosen keyed threaded coupler 16 does not turn relative to the housing 13. The external wall 48 of the central annular pocket provides a bearing surface for rotation of the spool 18 as shown by FIG. 1A. The housing 13 has a radial wall portion 54 and a peripheral wall portion 32. The housing radial wall portion 54 is typically shaped semi-spherical to increase the strength of the housing 13.

As described by FIG. 3B, circumscribing the housing geometrical axis of rotation 28 is disposed the peripheral wall portion 32 which includes a couple of apertures 40. These apertures 40 are lined with wear resistant eyelets 14 as shown in FIG. 3A. The eyelets 14 prevents wear of the housing peripheral wall portion 32 around the apertures 40 when the trimmer head 10 is in operation and the trimmer line 26 outside the head is heavily rubbing against the eyelets 14 (FIG. 1A and FIG. 1). The eyelets 14 are preferably 180 degrees apart from each other when using two extended trimmer line filaments in order to keep the rotational forces acting over the trimmer head 10 balanced. As described herein, the trimmer head 10 comprises a couple of apertures 40, since the preferred design comprises a couple of filament trimmer lines 26 extending outside the trimmer head 10, but in certain designs where the trimmer head 10 is designed for a single filament line, only one housing aperture 40 will be required. The housing apertures 40 location herein described, is for illustrative purposes since it is well known in the art that such apertures are located anywhere over the periphery of the head enclosure 15. Many prior art examples locate the eyelets 14 within the housing 13 and others locate the eyelets within the lower cover 20 depending on their head enclosure 15 design and their releasable joining method. To exemplify these variations FIG. 1 shows eyelets 14 located on the housing 13, and in FIG. 12, the eyelets 14 are shown located on the lower cover 20 since the releasable closing method used in the design moves the housing 13 and lower cover 20 joining line 156 above the geometrical center of the spool flanges 80, 111 and 112. The head enclosure 15 is the combination of a housing 13 and a lower cover 20, where the housing 13 is the portion of the head enclosure 15 connected to the trimmer machine arbor (not shown).

Figure 8A:
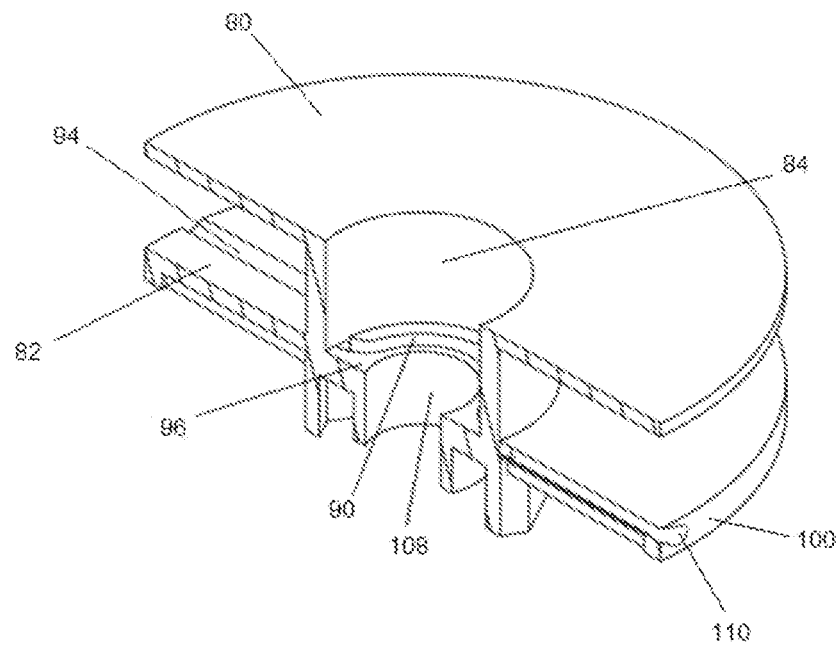
FIG. 8A is an isometric view of third embodied design for a single trimmer line storage chamber spool where a shaft extension crosses through its central core depicting the semi-circular trimmer line passage through the core.
Figure 8B:
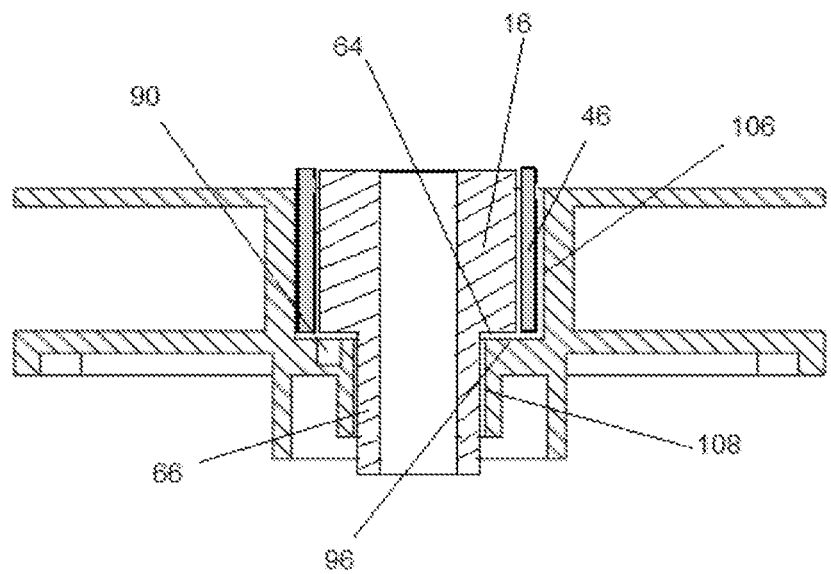
FIG. 8B is a cross sectional view through the central core of a single chambered spool depicting the trimmer line passage and the keyed threaded coupler iteration.

The housing central annular pocket external surface 48 is cylindrical and provides the bearing surface for the spool 18 rotation around the housing axis of rotation 28. In an alternate embodiment shown by FIGS. 8C and 9F a portion of the keyed threaded coupler 16 cylindrical surface 62 is aligned with a portion of the central annular pocket external surface 48. Under this configuration, a portion of the keyed threaded coupler 16 cylindrical surface 62 becomes the bearing surface for the spool 18 rotation. In alternate designs an extension of the threaded coupler 66 provides an additional bearing surface for the spool 18 as shown by FIG. 8B. Around the housing peripheral wall portion 32 are disposed a couple of locking apertures 36 which in cooperation with the lower cover axial lock tabs 132 (FIG. 2 and FIG. 6) axially secures the lower cover 20 against the housing 13 to maintain the internal parts of the trimmer head 10 confined within the head enclosure 15. This well-known locking system is herein used for descriptive purposes, without excluding many other housing 13 to lower cover 20 locking systems used by the prior art to provide the releasable locking system to the head enclosure 15. As shown by FIG. 3A, the housing 13 also includes structural ribs 38 to provide structural strength to the housing 13. The structural ribs 38 extend radially from the external wall of the central annular pocket 46 and continue through the internal wall of the housing peripheral wall portion 32 parallel to the internal side 42. These structural ribs 38 in cooperation with the lower cover lock slots 138 (FIG. 6) provide additional anti-rotational means to maintain the lower cover 20 rotationally locked against the housing 13. The structural ribs 38 also function as a spool-flange/housing gap closer to prevent the trimmer line 26 to slide out of the spool flanges through the gap between the spool flanges and the housing peripheral wall internal side 42. As the skilled in the art may recognize, the head enclosure 15 design and features contained therein used in this description are for illustrative purposes since any head enclosure 15 from the prior art will provide the necessary functionality for the present invention without departing from the its spirit and basic structure.

Figure 8C:
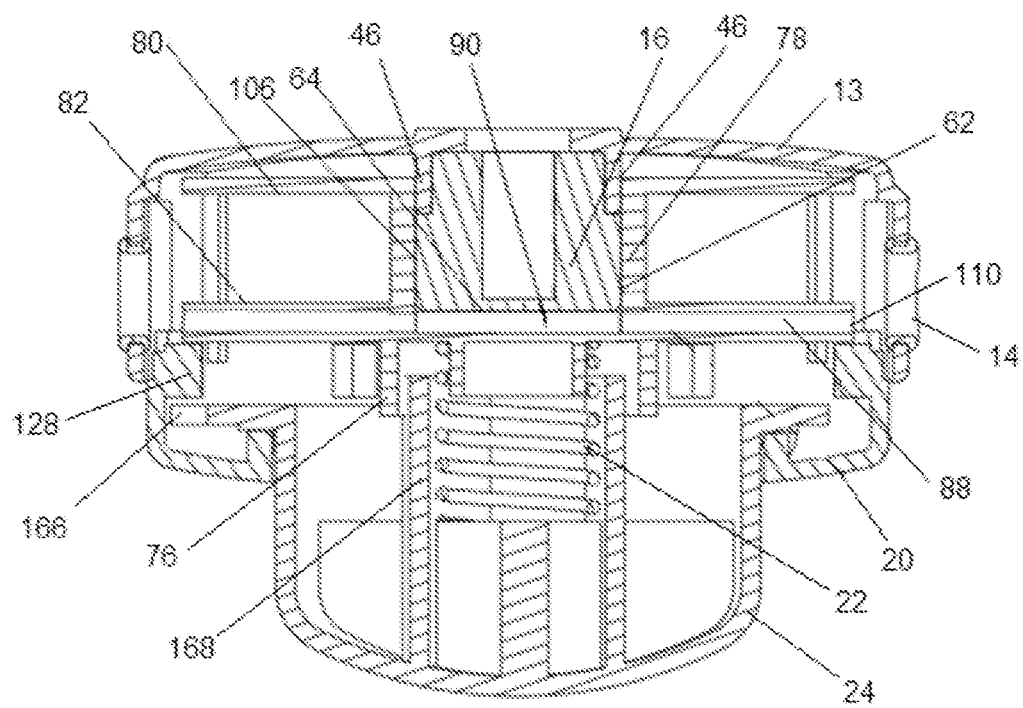
FIG. 8C is a cross sectional view of the complete head assembly showing how the treaded keyed coupler could be modified to provide a direct bearing surface to the spool.

FIG. 4A, FIG. 4B, FIG. 4C, FIG. 4D, FIG. 8A, FIG. 9A, FIG. 9B, FIG. 9C, FIG. 9D, FIG. 9E, FIG. 10A, FIG. 10B and FIG. 10C depicts the various details on the different alternate methods for the construction of the spool 18 and spool 19 without departing from the spirit of the present invention. The spool 18 with a single trimmer line storage chamber 120 is designated with the number 18 to differentiate it from the spool 19 having two trimmer line storage chambers 118 and 120. The basic spool 18 as shown by FIG. 1A and FIG. 1B assembled into the trimmer head 10 and by FIG. 4C as a single component. The spool 18 is disposed within the trimmer head 10 to receive the trimmer line 26, which extends outside the housing 13. The spool 18 is selectively rotatively relative to the housing 13 around the central annular pocket external wall 48 or around the keyed threaded coupler cylindrical surface 62 as depicted by FIG. 8C, but does not move axially within the housing 13 as many of the cutting heads from the prior art do to provide the trimmer line feed indexing controls. The spool rotation around the keyed treaded coupler cylindrical surface 62, has the advantage of providing a narrower fit with the spool bearing surface which is provided by the spool central cavity cylindrical wall 106 which maintains a better concentricity relative to the trimmer head axis of rotation 28, therefore reducing unwanted vibrations. Also as the skilled in the art may recognize, an axially fixed spool avoids potential line release issues when the line is being pulled from the spool windings in a severe angle which creates a vertical force over the axis of the spool 18 overriding the spring 22 force.

Figure 4A:
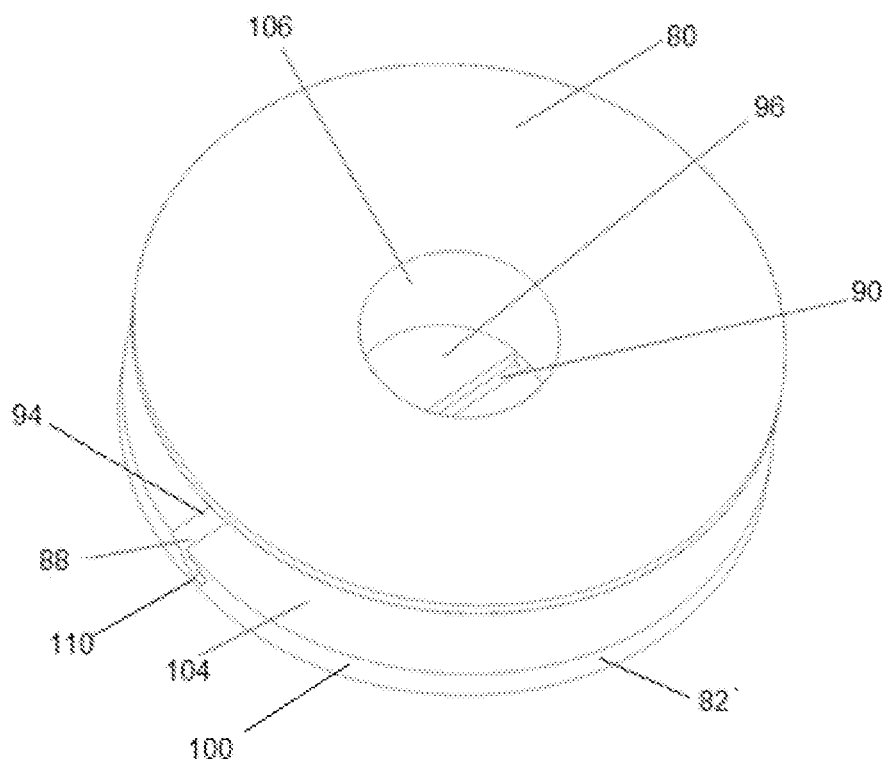
FIG. 4A is an isometric view showing an upper face of the first embodied design for the spool of the trimmer head object of the present invention.
Figure 4B:
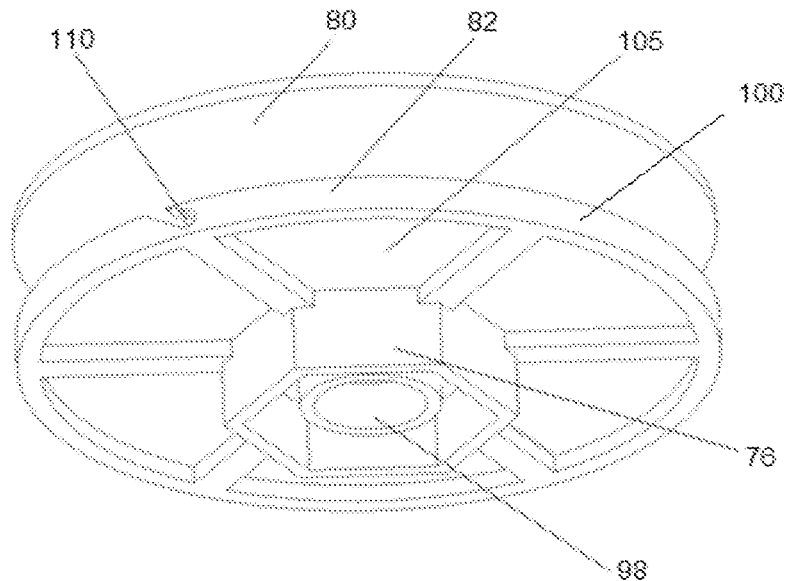
FIG. 4B is an alternate isometric view showing a lower face of the first embodied design for the spool of the trimmer head object of the present invention.
Figure 4C:
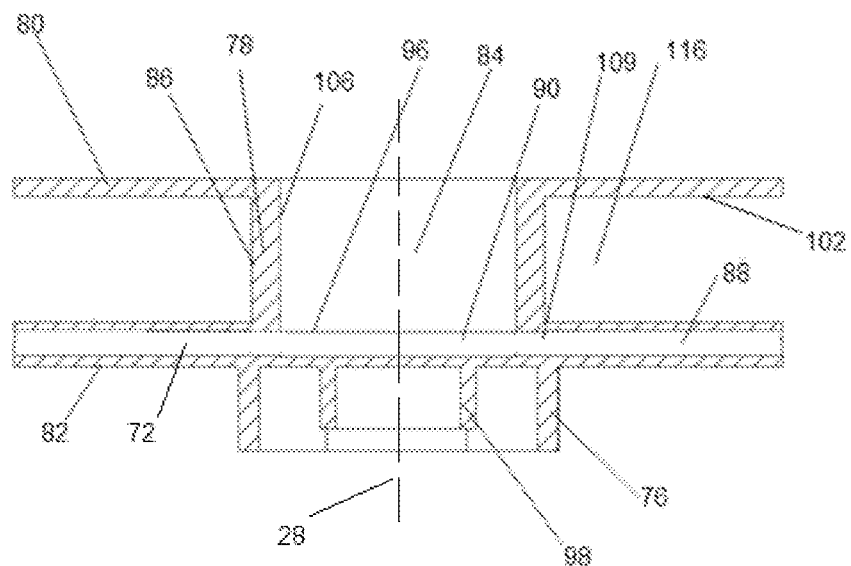
FIG. 4C is a cross sectional view showing the internal elements of the first embodied design for the spool of the trimmer head object of the present invention.
Figure 4D:
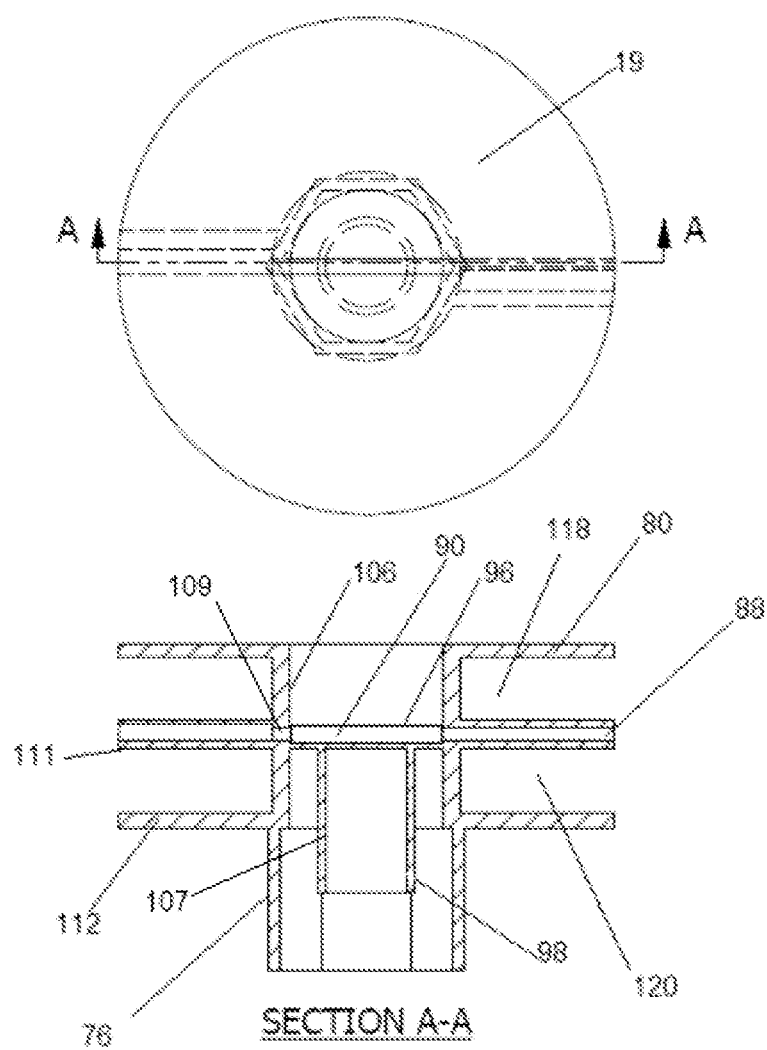
FIG. 4D is an orthogonal view of a second embodied spool design having a double chamber spool and a cross sectional view of the same depicting the configuration of the double chambered spool.
Figure 9A:
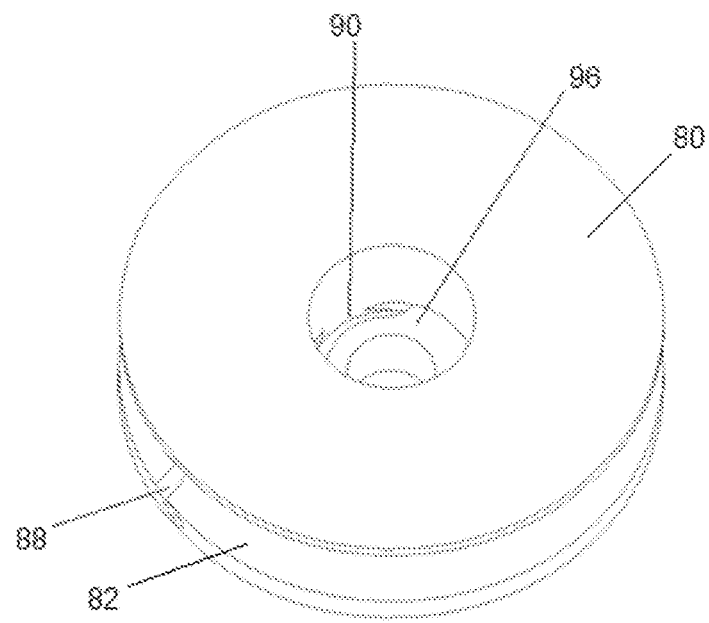
FIG. 9A is an isometric view of a fourth embodied single chambered spool depicting an alternate configuration of the trimmer line guide when an extended shaft is crossing through the spool core.
Figure 9B:
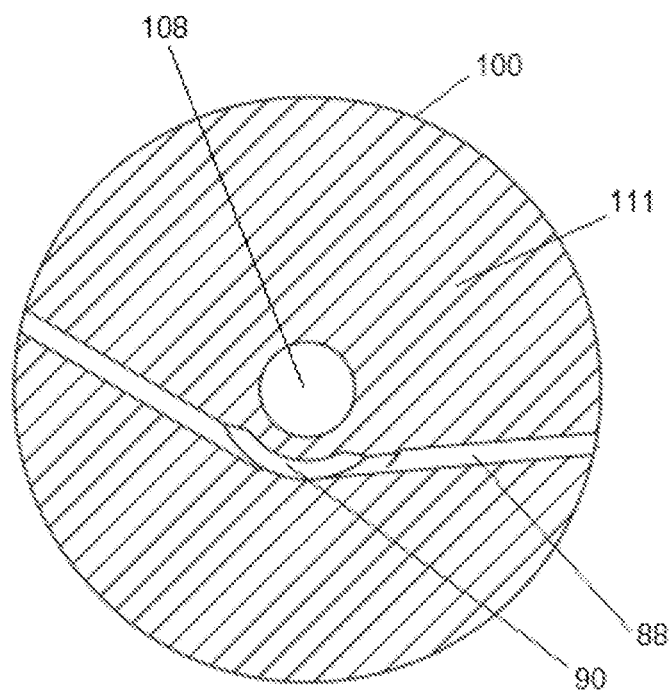
FIG. 9B is a cross sectional view through one of the flanges of the spool shown by FIG. 9a, depicting a detail of the trimmer line guide layout.
Figure 9C:
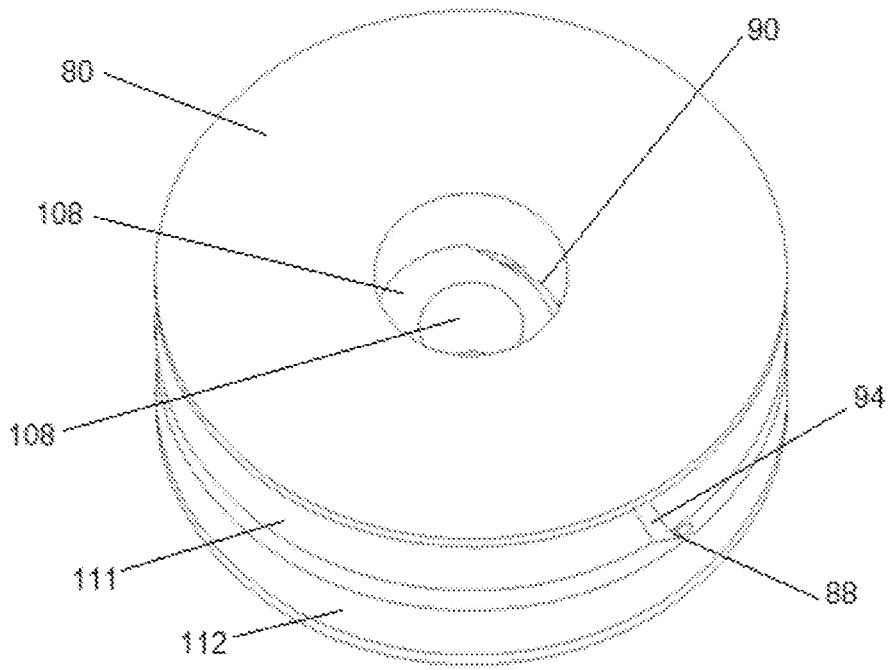
FIG. 9C is an isometric view of a double chambered spool having a drive shaft through its core where similar trimmer line guide passage as in FIG. 9b is implemented for threading the replacement line through the spool core.
Figure 9D:
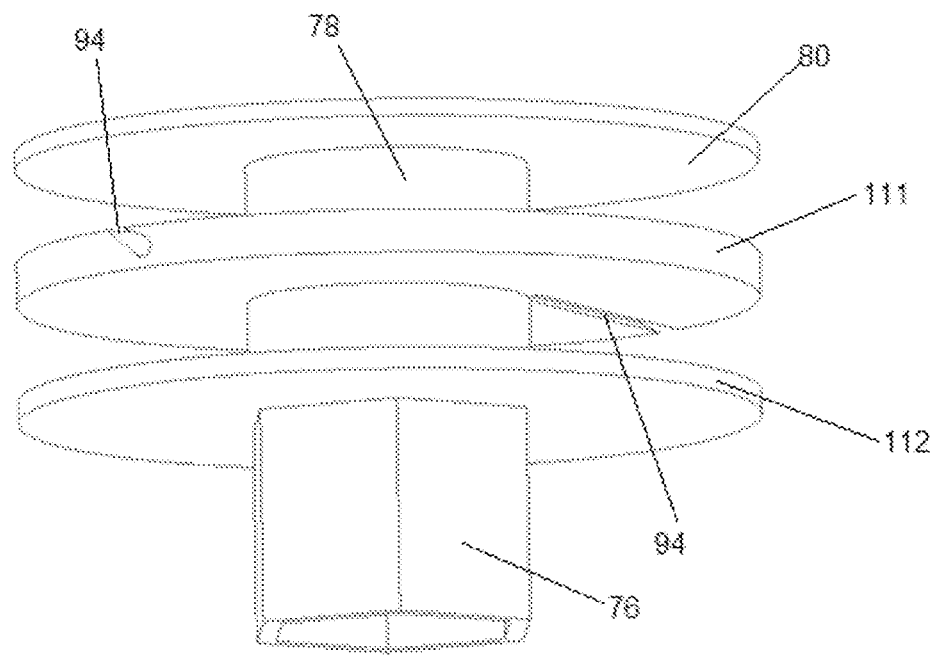
FIG. 9D is an isometric view of a double chambered spool having a drive shaft through its core where similar trimmer line guide passage as in FIG. 9b is implemented for threading the replacement line through the spool core and showing how the two external trimmer line guide windows are on the opposite sides of the middle spool flange.
Figure 9E:
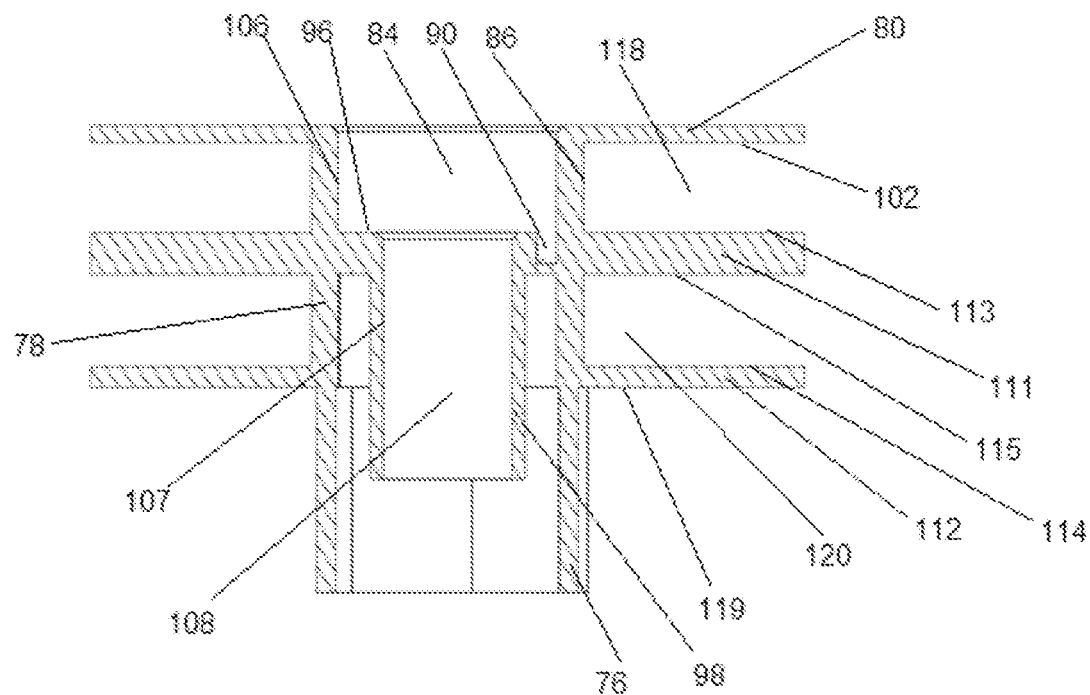
FIG. 9E is a cross sectional view of a double chambered spool having a drive shaft through its core where similar trimmer line guide passage as in FIG. 9b is implemented for threading the replacement line through the spool core.
Figure 9F:
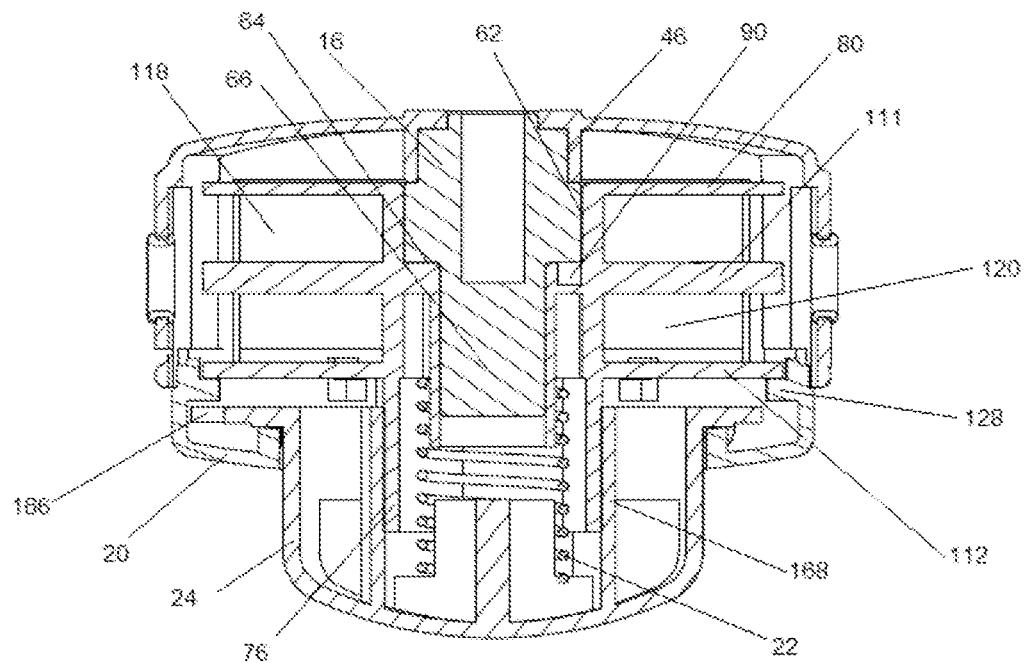
FIG. 9F is a cross sectional view of a trimmer head assembly with a double chambered spool having a drive shaft through its core where similar trimmer line guide passage as in FIG. 9b is implemented for threading the replacement line through the spool core.

As depicted by FIGS. 4C and 4D, the spool 18 is comprised of a cylindrical hollow core 78, a couple of cylindrical flanges 80 and 82 radially extending from the cylindrical hollow core 78, a central cavity 84 disposed concentrically within the cylindrical hollow core 78. The spool 18 has a trimmer line storage chamber 116 for storing wound trimmer line 26 delimited by the upper cylindrical flange 80, a lower cylindrical flange 82, and by the spool hollow cylindrical core peripheral surface 86. Although the basic spool 18 configuration is described herein by having a single trimmer line storage chamber 116, the skilled in the art may recognize that within the described configuration, the spool line storage chamber 116 may be subdivided into two storage chambers as shown by FIG. 4D, by adding an extra flange projecting from the hollow cylindrical core 78 to provide separate trimmer line storage chambers 118 and 120 for each exiting filament line 26 segments. This configuration oblige to have the flexible trimmer line passages 88 and 90 going through the central flange 111. As the lower flexible storage line chamber 120 becomes directly unsupported, additional spool bearing surface 107 is created to provide the required support as shown by FIG. 9F. Depicted by FIG. 4C the spool central cavity 84 disposed concentrically within the hollow cylindrical core 78 includes a central cavity cylindrical inner wall 106 for rotation of the spool 18 around the housing central annular pocket external wall 48 or/and the keyed threaded coupler cylindrical surface 62. The spool central cavity 84 is delimited by the spool central cavity cylindrical wall 106 and a central cavity closed face 96. The spool lower cylindrical flange 82 includes a trimmer line guide passages 72 therethrough. The spool trimmer line guide passage 72 is comprised of two diametrically opposed external trimmer line guide passages 88 and an inner trimmer line guide passage 90 forming a single passage 72 crossing diametrically through the spool 18. The external trimmer line guide passages 88, are delimited by the hollow core peripheral surface 86 and the lower cylindrical flange peripheral wall 100 and the inner trimmer line passage 90 within the central cavity 84. The external trimmer line guide passages 88 are diametrically opposed and mirrored by a plane crossing the spool axis of rotation 28 in a way that separates the two external trimmer line guide passages 88 by 180 degrees. These external trimmer line guide passages 88 comprise open windows 94 disposed over the lower cylindrical flange upper face 104 better illustrated by FIG. 4A. These lower cylindrical flange open windows 94 provide a route for the flexible trimmer line 26 to exit the external flexible trimmer line guide passages 88 when the spool 18 is rotated after the trimmer line 26 has been inserted through the spool trimmer line guide passage 72, in a way that allows the flexible trimmer line 26 to start winding around the hollow cylindrical core peripheral surface 86 as the knob 24 is manually rotated during manual flexible trimmer line 26 winding transmitting the rotational motion to the spool 18.

Figure 7:
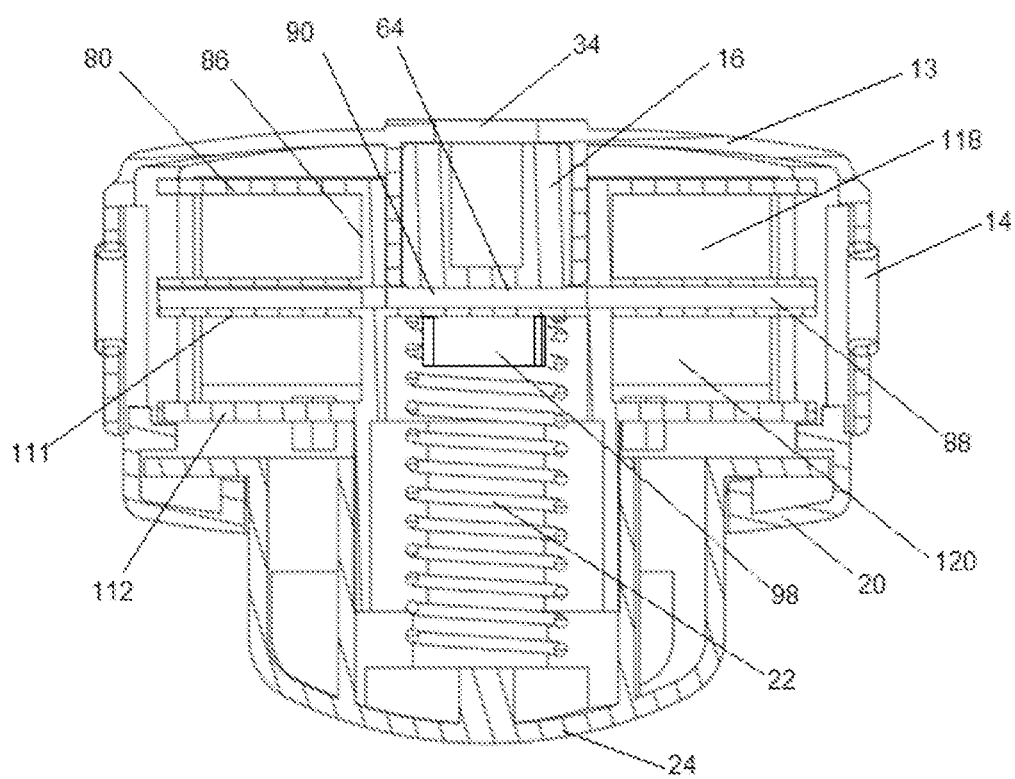
FIG. 7 is a cross sectional view of the externally windable trimmer head of the present invention, depicting the double trimmer line storage chamber spool.

Referring to FIG. 4C and FIG. 4D, the inner trimmer line guide passage 90 is disposed over the central cavity closed face 96 delimited by the hollow core peripheral surface 86. The central cavity closed face 96 provides a thrust surface which in cooperation with the keyed threaded coupler thrust face 64 maintains the spool 18 axially fixed to the housing assembly 12 under the force of the spring 22. The inner trimmer line guide passage 88 is opened at the spool central cavity closed face 96. To maintain the trimmer line 26 within the trimmer line guide inner passage 90 while being threaded through the spool 18, the compression spring 22 biases the spool central cavity closed face 96 against the keyed threaded coupler thrust face 64 to fully cover the open window 94 of trimmer line guide inner passage 90. The hollow cylindrical core wall opening 109, establishes the communication between the inner flexible line guide 90 and the external line guide passages 88. The external line guide passage openings 110, located in the spool lower cylindrical flange peripheral surface 100, are selectively alignable with one of the pair of eyelets 14 of the housing assembly 12 to feed a trimmer line 26 therethrough the spool trimmer line guide passage 72. FIG. 1B and FIG. 7 show a section through the axis of rotation 28 of the trimmer head 10 with a trimmer line 26 threaded through the head assembly, crossing through the housing eyelets 14 and the spool 18.

The keyed threaded coupler 16 provides several functional features within the cutting head object of the present invention: 1.—Provides the coupling threads to secure the cutting head to the trimmer head 10 driver device. 2.—Provides the proper engagement with the cutting head housing assembly 12 to insure the rotation of the head enclosure 15 with the trimmer head machine drive shaft. 3.—Provides a bearing surface for rotation of the spool 18. 4.—Provides a thrust surface to maintain the spool 18 axially restricted within the trimmer head 10. 5.—Provides a seal for the spool trimmer line guide inner passage open window 94.

The lower portion of the spool 18 shown by FIG. 4B, includes a hexagonal protrusion 76 projecting downwards from the spool lower flange lower face 105, which in cooperation with a matching knob hexagonal protrusion 168 axially projecting from the knob dome 160 (FIG. 5B) provides selectively controlled rotation of the spool 18. Also shown by FIG. 4B, FIG. 4C and FIG. 4D is the spool spring guide 98 to maintain the spring 22 concentric to the trimmer head axis of rotation 28. The hexagonal shape of the engaging system between the spool 18 and the knob 24 is only exemplary in the features of the invention description and could be implemented in many possible shaped profiles such as ellipsoidal, polygonal, splined ribs or other methods known by the art to rotationally engage two rotating structures while still allowing axial displacement along an axis of rotation As depicted by FIG. 4D, a variation on the spool 18 configuration is herein described. This alternate spool 19 configuration includes two separate trimmer line storage chambers, an upper chamber 118 and a lower chamber 120. Having two separate chambers, allows to wind the trimmer line into two separate trimmer line 26 storage chambers. This design provides the advantage of having separate trimmer line windings for each one of the trimmer line extending outside the head, which helps to avoid trimmer line entanglement inside the spool trimmer line storage chambers. This alternate spool 19 configuration requires that the lower cylindrical flange 82 from the single chambered spool 18, is positioned between two external cylindrical flanges becoming the middle cylindrical flange 111, between the upper cylindrical flange 80 and the spool inferior cylindrical flange 112. The upper line storage chamber 118 is delimited by the upper cylindrical flange lower face 102, the middle cylindrical flange upper face 113 and the spool hollow cylindrical core peripheral surface 86. The lower trimmer line storage chamber 120 is delimited by the spool middle cylindrical flange lower face 115, the inferior cylindrical flange upper face 114 and the hollow cylindrical core peripheral surface 86. As in the previously described single chambered spool 18, the different configurations of the trimmer line guide passage 72 is driven by the use of a trimmer machine with a standard drive shaft or a trimmer machine with an extra-long drive shaft. On one configuration for the double chambered spool 19 where a short drive shaft is used, the trimmer line passage 72 crosses straight through the spool similarly as done in the first embodiment of the present invention on a single chambered spool 18 depicted by FIG. 1B. This spool 19 configuration is shown by FIG. 4D, where the spool central cavity closed face 96 is now within the faces of the middle cylindrical flange 111 to enable the trimmer line guide passage to cross straight through the middle cylindrical flange 111 and the spool cylindrical hollow core 78. This condition shortens the bearing surface of the double chambered spool 19 since the keyed threaded coupler thrust face 64 only extends to the middle of the spool bearing surface designated as the spool central cavity cylindrical wall 106. The skilled in the art may recognize that under this condition, the trimmer line pull force from the spool lower line storage chamber 120, may create a binding condition on the spool rotation since it will be creating a momentum around the spool bearing surface provided by the central cavity cylindrical wall 106. To resolve this condition, there are two possible solutions. One solution consists of increasing the overlap between the spool hexagonal protrusion 76 and the knob hexagonal protrusion 168. The increase in overlap between the engaging structures provide the support for counteracting the spool lower trimmer line storage chamber 120 trimmer line pull force. The cooperation between the knob peripheral wall portion 158 and the lower cover central opening internal wall 124, provides the added bearing surface for knob 24 rotation. This configuration is shown in a trimmer head assembly cross sectional view by FIG. 7, which also shows how the trimmer line guide passage is aligned with the eyelets 14. A second solution consists on extending the keyed threaded coupler extended bearing surface 66 around the spool central cavity area delimited by the spool middle flange 111 and the spool inferior flange 112 as depicted by FIG. 9E and FIG. 9F.

Depicted by FIG. 9F, is the spool 19 design in accordance to the previously described second solution which also is to be used when a trimmer machine with extra-long drive shaft, in both applications the trimmer line guide passage is forced to go around the machine shaft or around the key treaded coupler extension, condition previously addressed on the single chambered spool 18 configuration. The strategy is very similar for the design of the double chambered spool 19. As depicted by FIG. 9B, FIG. 9C, FIG. 9D, FIG. 9E and FIG. 9F, the trimmer line guide passage 72, comprised of two non-radial external trimmer line guide passages 88 and an inner semi-circular trimmer line guide passage 90. The trimmer line guide passage 72 configuration offers little drag for trimmer line insertion due to the straight paths tangentially merging into a soft curved section. Similarly as described in the single chambered spool 18, the external trimmer line guide are mirrored by a plane crossing through the spool axis of rotation 28 (same as the trimmer head axis of rotation), merging into the inner semi-dircular trimmer line guide passage 90 in a tangential path. The only difference between this trimmer line guide passage 72 used on the single chambered spool and in the double chambered spool is the location of the external trimmer line guide passages open windows 92. For the double chambered spool 19 one of the external trimmer line guide passages open windows 92 is disposed over the middle cylindrical flange upper face 113 facing the upper trimmer line storage chamber 118, the other external trimmer line guide passages open windows 92 is disposed over the middle cylindrical flange lower face 115 facing the lower trimmer line storage chamber 120. This configuration allows for winding the trimmer line into the two separate trimmer line storage chambers. It is also important to observe that the key threaded coupler thrust face 64, now lies into the transition of the two different diameters 62 and 66.

In an additional embodiment depicted by FIG. 9F, the spool rotational bearing surfaces are extended thought the spool inferior flange 112 to create support for the trimmer line wound within the lower trimmer line storage chamber 120. This is accomplished by extending the keyed threaded coupler 16 throughout the spool hollow cylindrical core 78 while still maintaining the sealed path for the trimmer line when crossing through the hollow cylindrical core 78. As the skilled in the art will recognize, extending the shaft throughout the spool hollow cylindrical core 78 will not allow trimmer line insertion straight through, which is a similar condition previously addressed when the trimmer machine shaft is longer than typical on a single chambered spool 18. This condition forces to route the line around the keyed treaded coupler extension 66 while leaving the middle shoulder 60 to operate as the keyed threaded coupler thrust face 64 to maintain the spool in a fixed rotational plane within the housing and to seal the semi-circular inner trimmer line guide 90 around the keyed threaded coupler shaft extension 66. The cross sectional view shown by FIG. 9F depicts this configuration where the external trimmer line guide passages 88 crossing the spool flange 111 are not radially oriented and tangent to the semi-circular inner trimmer line guide passage 88 as depicted by FIG. 9B. The trimmer line guide passage 72 is not shown in FIG. 9F, since the cross sectional plane does not follow the trimmer line guide passage 72. This configuration is common for any driving shaft length.

Figure 10A:
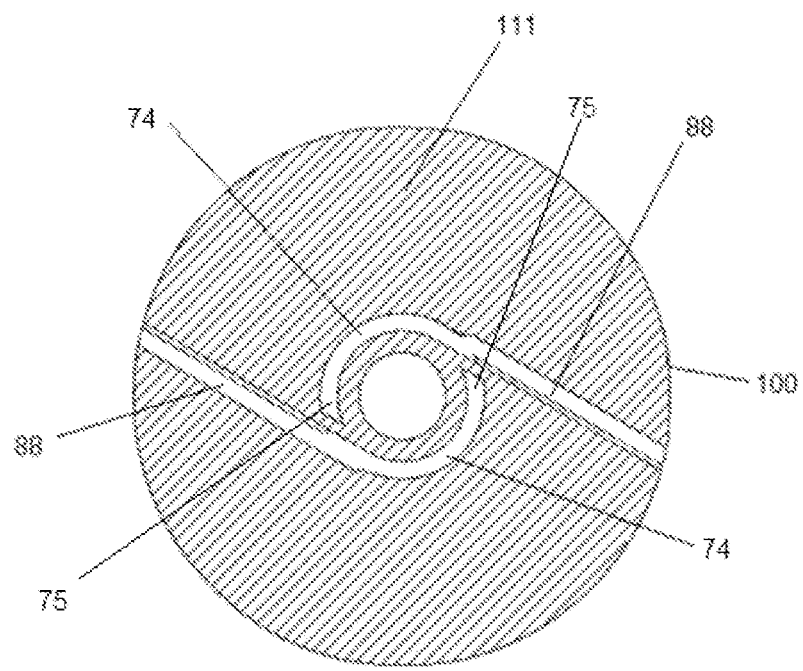
FIG. 10A is a cross sectional view through one of the flanges of a single or double chambered spool showing a fifth embodied spool design where a pair of blind circular central core trimmer line guides are used to hold the trimmer line ends in place.
Figure 10B:
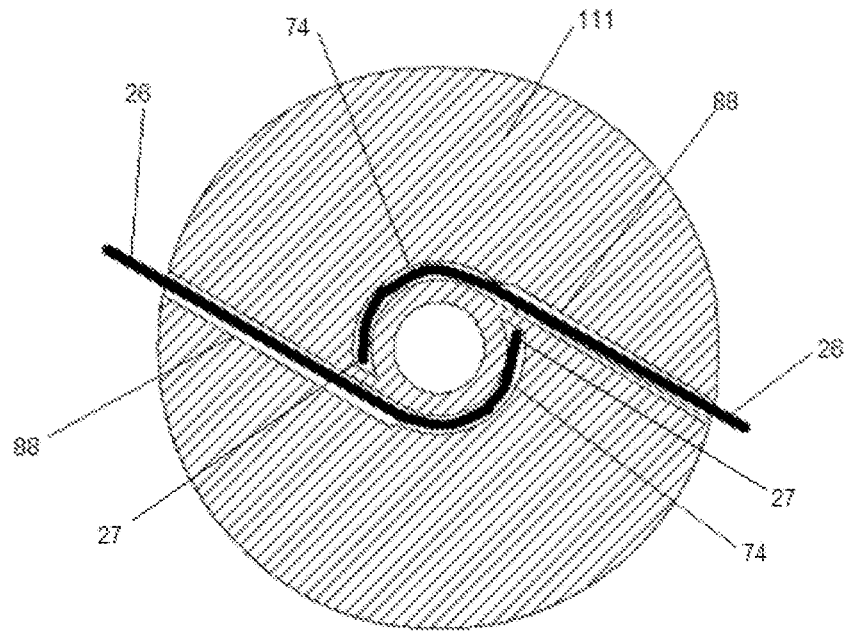
FIG. 10B is a cross sectional view through one of the flanges of a single or double chambered spool showing a fifth embodied spool design where a pair of blind circular central core trimmer line guides are used to hold the trimmer line ends in place.
Figure 10C:
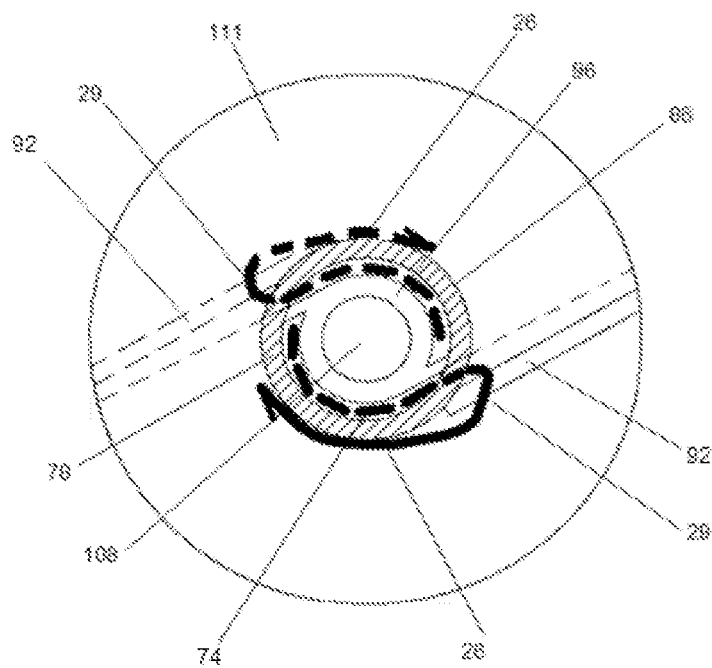
FIG. 10C show a fifth embodied spool design showing how the trimmer line bends to start winding around the spool central core.

In another yet embodiment of the present invention is depicted by FIG. 10A, FIG. 10B and FIG. 10C where the single chambered spool 18 or the double chambered spool 19 is configured in a way that allows to place a single trimmer line end line or a double trimmer line end line without crossing completely through the spool hollow cylindrical core 78. This method for externally feeding the line into the spool is accomplished by creating trimmer line ends anchoring structures within the central cavity closed face 96 consisting of a pair of blind semi-circular grooves 74 with variable depth. When inserting the trimmer line ends through these semi-circular grooves 74, a predetermined level of friction over the trimmer line ends 27 is required to hold them temporarily embedded into the semi-circular grooves 74. Since the trimmer line is flexible, the curved path of the semi-circular grooves 74 will not provide substantial friction to temporarily retain the flexible trimmer line ends 27. The additional force required is provided by pinching of the flexible trimmer line ends 27 between the semi-circular grooves floor and the threaded coupler thrust face 64. To enable the pinching force between the semi-circular grooves floor and the threaded coupler thrust face 64, the semi-circular grooves 74 floor is shallow. This shallow floor section allows the flexible trimmer line end 27 to be pinched by the spring 22 force between the spool semi-circular groove floor and the keyed threaded coupler thrust face 64. The friction created by the grooves 74 curved path and the flexible line 22 pinching, applies the required resistance to the trimmer line 26 to stay captive while the spool is being rotated to wind the replacement trimmer line around the spool hollow cylindrical core 78. While manually turning the spool for winding the flexible trimmer line 22, to contact of the keyed threaded coupler thrust face 64 and the trimmer line ends 27, creates a frictional force over the flexible trimmer line ends 27 in the direction towards the semi-circular groves blind end 75, this creates a frictional force over the trimmer line ends 27 in the direction of the semi-circular grooves blind end 75 which pulls the flexible trimmer line ends 27 towards the semi-circular grooves blind end 75, preventing the flexible trimmer line from being pulled out of the semi-a circular grooves 74 while manually rotating the spool.

As the flexible trimmer line 26 is wound into the spool 19, the replacement flexible trimmer line 26 is guided to exit the external trimmer line guide passages 88 through the trimmer line external passage window 94 disposed over the lower spool flange upper face 104 in the single chambered spool 18 or both middle cylindrical flange faces 113 and 115 (FIG. 9E) when used on a double chambered spool 19. After exiting the flange open windows, the trimmer line starts wrapping around the spool hollow cylindrical core 78 creating a trimmer line kink 29 as the trimmer line is bent at the point where the inner semi-circular groove 74 meets the spool hollow core peripheral surface 86. The kink 29 provides an additional holding required to pull the replacement trimmer line inside the trimmer line storage chamber while manually rotating the single chambered spool 18 or the double chambered spool 19.

Figure 5A:
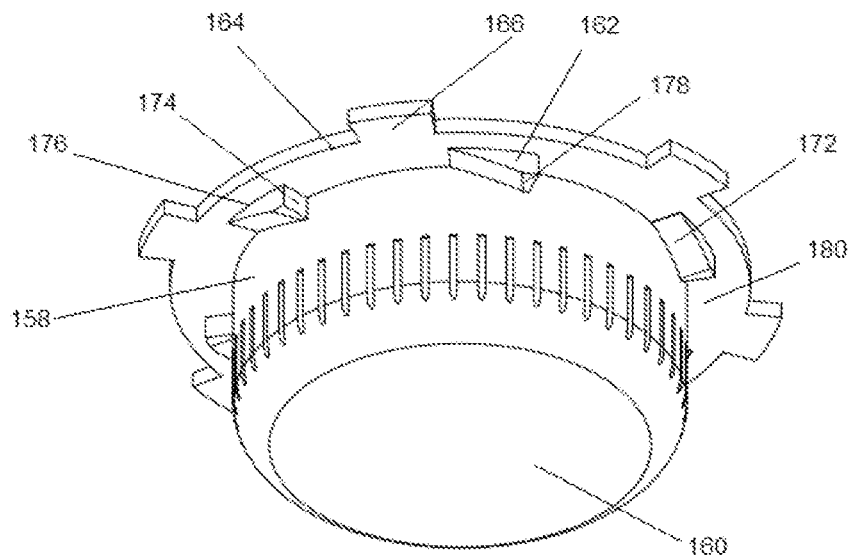
FIG. 5A is an isometric view of the knob lower face showing its features.
Figure 5B:
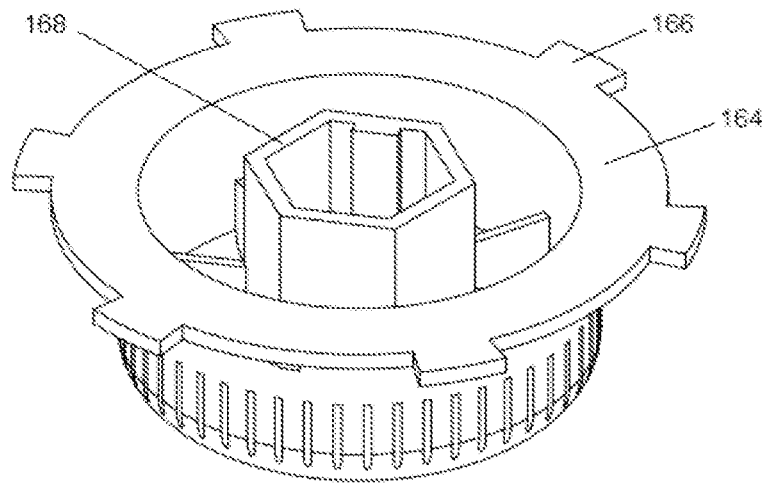
FIG. 5B is an alternate isometric view of the knob upper face showing its features.

The knob 24 structure is depicted by FIG. 5A and FIG. 5B. The knob 24 has a central body comprised by a dome 160 and peripheral walls portion 158 extending concentric to the knob 24 axis of rotation 28. Extending radially at the upper end of the knob peripheral wall portion 158 is disposed a flange 164. The flange 164 comprises a plurality of tabs 166 radially extending outwards from the flange 164 perimeter and equally spaced angularly. Extending upward from the knob dome 160 and parallel to the knob axis of rotation 28 is a hex protrusion 168, which is engagable with the spool hex protrusion 76 to allow relative axial displacement between the knob 24 and the spool 18 while preventing relative rotational movement between the knob 24 and the spool 18. The knob 24 include a plurality of teeth 162, angularly equidistant and projecting downwards from the knob flange 164 and concentric to the knob peripheral wall portion 158. The knob teeth 162 are triangular shaped having an inclined surface 172 in one side, a vertical surface 174 on the opposite side, and a base 176 connected to the knob flange lower face 180. The vertex or apex 178 is where the vertical surface 174 intersects the inclined surface 172. The apex 178 may be a truncated apex 182 and the teeth 162 will adopt a trapezoidal shape, which for functional and descriptive purposes the knob apex 178 and truncated knob apex 182 will be equivalent to the triangular teeth shape herein described. In general, when the teeth have a truncated apex, the true apex is the intersection of the inclined and vertical surfaces projections.

Figure 6:
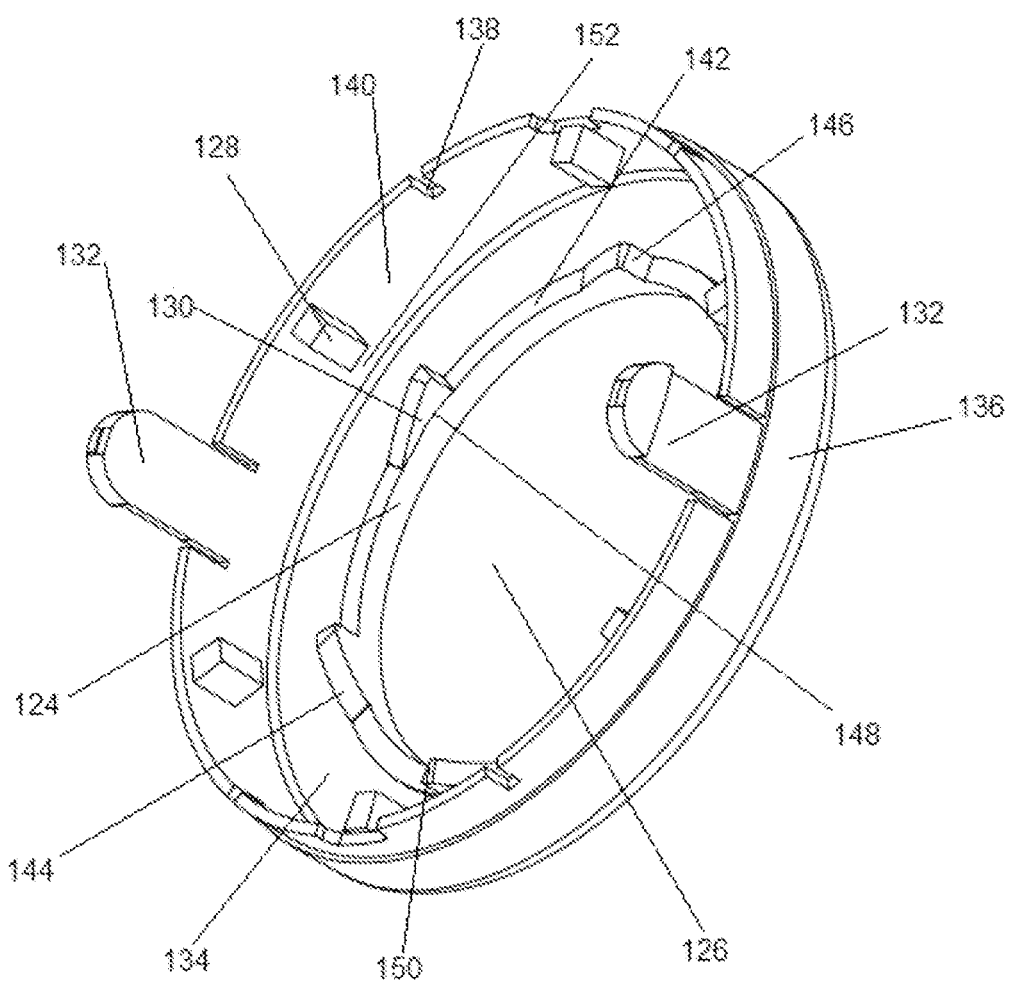
FIG. 6 is an isometric view of the lower cover showing its features.

The lower cover 20 elements are depicted by FIG. 6. The lower cover 20 is releasable attached to the lower edge of the housing cylindrical peripheral wall portion 32 to hold the assembly together. The lower portion of the lower ring peripheral wall portion 136 merges with a radially oriented wall section 134 that is delimited by a central annular opening 126. The central annular opening 126 includes a small internal wall 124 that provides rigidity to the lower cover 20 structure and at the same time is utilized as support for a plurality of lower cover teeth 130. The lower cover teeth 130 are similar in shape, number and function to the knob teeth 162 previously described and depicted in detail by FIG. 6. The lower cover teeth 130 are located in the same diametric position as the knob teeth 162 and are disposed over the internal face 142 of the lower cover central opening ring shaped wall 124 in a way illustrated by FIGS. 6 and 7, in which the knob teeth inclined surface 172 faces the lower cover teeth inclined surface 144 and the knob teeth vertical surface 174, faces the lower cover teeth vertical surface 146. Another important structures within the lower cover 20 are the lower cover retention blocks 128 which are a plurality of structures radially protruding from the lower cover peripheral wall section internal surface 136. These lower cover retention blocks 128 are equally spaced over the circumference of the lower cover peripheral wall section 136 and they are equal in number to the lower cover teeth 130. The lower cover retention blocks 128 extend over the lower cover peripheral wall section internal surface 140 in a direction parallel to the lower cover axis of rotation 28 which is (common with the head assembly). The lower cover retention blocks 128 are interrupted at the intersection of the lower cover peripheral wall section 136 with the lower cover radially oriented wall section 134 by the lower cover retention blocks gap 152. The size of the lower cover retention blocks gap 152 is designed to allow the passage of the knob flange tabs 166 for partial rotation of the know 26 is allowed in its extended position. The lower cover teeth 130 and the lower cover retention blocks 128 are the key elements for the lower cover rotation control elements which in cooperation with the knob 24 rotation control elements make possible a ratcheting mechanism combined with an indexing mechanism.

External indicators (not shown) viewable from outside the trimmer head 10 may be provided so that the user is aware when the spool external trimmer line guide passage 88 and housing eyelets 14 are aligned and ready for receiving replacement trimmer line external guide opening 121 is facing the position of the eyelets 14. The ratcheting operation is allowed by the engagement of equally radially distributed teeth located within the knob 24 and equally radially distributed teeth located within the lower cover 20 cooperating with the force of a spring 22 that allows a controlled torque of the knob 24 while the teeth inclined surfaces wedges into each other driven by the torque applied to the knob for rotation and the force of the compression spring 22, creating a vertical force that overrides the force of the spring 22 producing the ascend of the knob 24 while the set of knob teeth 162 climbs over the opposite set of lower cover teeth 130. Once the knob teeth apex 178 passes over the lower cover teeth apex 150, the force of the spring moves the knob 24 back to its extended position and the cycle repeats as far as the knob 24 is manually rotated in the proper direction. This motion is only allowed in one direction since on the opposite direction the knob teeth vertical surface 174, faces the lower cover teeth vertical surface 146 and no wedging action is possible. The teeth "jumping" action allows manual knob rotation on one direction only.

The ratchet mechanism is used solely for manually winding trimmer line 26 around the spool 18. The indexing mechanism is opposite to the ratchet mechanism. As previously mentioned, during operation, the knob 24 is in extended position where the knob teeth vertical surface 174 is in contact with the lower cover teeth vertical surface 146 under the torque provided by the centrifugal force of the line extending outside the trimmer head eyelets 14. The only way to allow rotation is by raising the knob teeth 162 above the lower cover teeth 130, step that is achieved when the knob dome 160 is bumped against the ground forcing the knob to its retracted position. Once in its retracted position the knob 24 is free to rotate briefly till the knob flange tabs 166 become in contact with the lower cover retention blocks 128, stopping the knob 24 rotation in its retracted position. Once the ground force over the knob dome 160 ceases, the spring 22 urges the knob 24 to its extended position. During the descend the knob flange tabs 166 disengaged the lower cover retention blocks 128 and are allowed to rotate briefly under the lower cover retention blocks gap 152 till the knob teeth vertical surface 174 becomes again in contact with the lower cover teeth vertical surface 146, stopping the knob rotation. Unlike the prior art, the indexing mechanism and the ratchet mechanism are solely limited to the iteration of the knob 24 rotation control elements and the lower cover 20 rotation control elements.

Figure 11A:
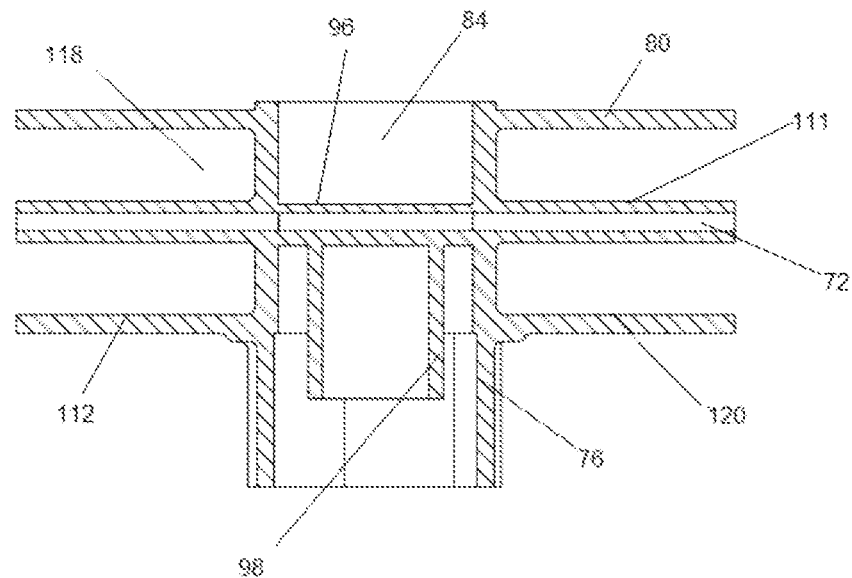
FIGS. 11A and 11B depicts a double chambered and a single chambered spool with a straight through trimmer line guide.
Figure 11B:
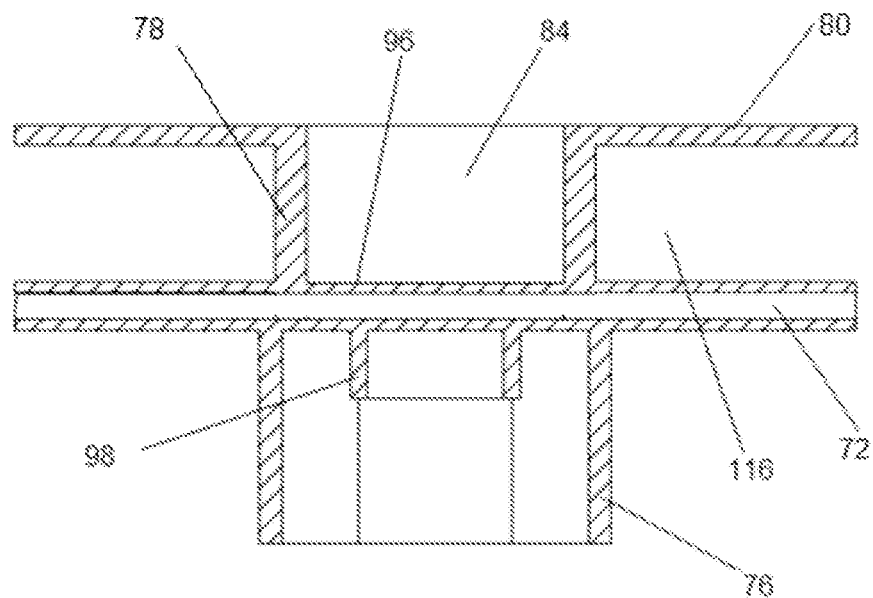

Since the plastic molding process and methods will allow to use of steel cores that can create an straight through trimmer line passages 72 throughout the spool 18, the inner trimmer line passage 90 on trimmer heads using an standard length drive shaft may be continuous without creating the inner trimmer line passage 90 inside the spool central cavity 84 as shown in FIG. 11A and FIG. 11B. This technique only could be used to create straight through trimmer line passages on spools for trimmer heads with standard short drive shaft where the end of the drive shaft does not reach the keyed threaded coupler thrust face 64. When a driving unit with a long drive shaft is used and extends beyond the keyed threaded coupler thrust face 64 the trimmer line passage cannot go through the shaft, but around the shaft making this method not feasible. FIG. 11A shows a double chambered spool 19 with the straight through trimmer line passage 72. FIG. 11B depicts a single chambered spool 18 with similar straight through trimmer line passage 72 crossing through the spool cylindrical core 78.

Figure 12:
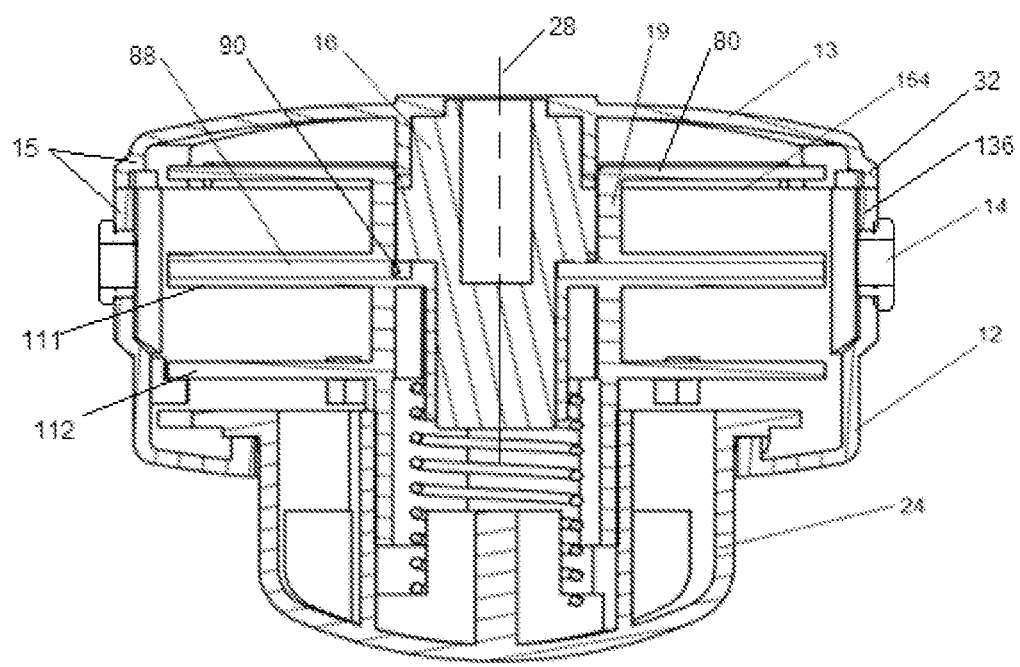
FIG. 12 depicts an alternate method of configuring the housing and housing cover of the cutting head object of the present invention.

As depicted by FIG. 12, as the skilled in the art may recognize, the configuration of the housing-cover interface could be changed in a way that the housing peripheral wall 32 becomes very short and the lower cover peripheral wall section 136 becomes longer as shown by FIG. 12. Under this condition the eyelets 14 are positioned over the lower cover peripheral wall 136 while maintaining unchanged the location of the internal elements. This head enclosure 15 configuration is well documented by the prior art where a variety of designs are encountered having a housing/lower cover joining line 156, anywhere over the head enclosure 15 peripheral surface The functional features on the trimmer head of the present invention are achieved when maintaining the spool axially constrained within the trimmer head enclosure 15 and leaving the ratcheting and indexing mechanism confined to the knob and lower member of the housing. The skilled in the art will recognize that the illustrated elements that may possible the axial constriction of the spool may be slightly changed or replaced to achieve the same function. This may involve concentric walls on the outside of the spool flanges cooperation with concentric walls in the housing to provide bearing surfaces for rotation similar to those illustrated by the U.S. Pat. No. 9,924,631 by Alliss. These solutions are commonly used in the prior art having floating spools with axial movements within the head and even though these solutions are possible for use in the present invention without departing from the spirit of the invention, they are not desirable due to increased friction and rotating elements poor concentricity.

Based on the aforementioned description, the skilled in the art will recognize that for the ratchet mechanism to operate is only necessary any cam-follower combination in which the teeth inclined surface is a cam driving a cam follower which is allowed to slide over the inclined surface of the teeth such as ribs or trapezoidal blocks. Cam followers for this type of mechanism may be portions of tabs, teeth, ribs or other shapes that are capable of sliding over an inclined surface in one direction and having a surface that will not allow sliding on the opposite direction. Similarly for the indexing mechanism, angularity between the surfaces of the walls in contact is often used to facilitate the disengagement from the indexing elements without affecting the indexing mechanism. In the detailed description of the cutting head object of the present invention, opposing teeth with similar geometry are utilized for descriptive purposes, while it is understood that rectangular or trapezoidal elements interacting with inclined surfaces will render the same effect.

It is understood that the embodiments of the present invention that are illustrated and described are merely exemplary and that a person skilled in the art can make many variations to those embodiments. For instance, the number of tab projections, teeth projections, cooperating surfaces projections can be varied in numbers and shape while the functionality remains the same. Likewise, the shape of the bump knob, the shape of the housing, the shape of the spool and the lower cover/housing locking system can be varied into numerous configurations that are not illustrated and well known by the prior art. All such embodiments are intended to be included within the scope of the present invention as defined by the claims. None of the embodiments need to include any or all of the features of the invention, while this invention has been described as having a preferred design, it is understood that it is capable of further modifications, uses and/or adaptations of the invention following in general the principle of the invention and including such departures the present disclosure as come within the known or customary practice in the art to which the invention pertains and as maybe applied to the specific features hereinbefore set forth, and fall within the scope of the invention and the limits of the appended claims, is therefore to be understood that the present invention is not limited to the sole embodiment described above, but encompasses any and all embodiments within the scope of the following claims.

What is claimed is:

1. A cutting head device for a flexible trimmer line mowing machine comprising:
- a head enclosure comprising a housing and a lower cover, said housing having cylindrical walls concentric to an axis of rotation and including a central annular cylindrical pocket concentric to said housing axis of rotation, a keyed threaded coupler disposed within said housing central annular cylindrical pocket, where said keyed threaded coupler comprising a threaded end for attaching said housing to said flexible line trimmer mowing machine, said head enclosure having peripheral apertures;
- said lower cover releasable coupled to said housing to gain access to the interior of said head enclosure, wherein said lower cover comprises a cylindrical wall section and a radial wall section extending radially outwards from a central annular opening, and said lower cover comprising cooperatively interengagable rotation control means;
- a knob disposed within said lower cover central annular opening and protruding axially downwardly from said lower cover central annular opening, wherein said knob is rotationally and axially movable relative thereto between an extended position and a retracted position, where spring means are provided for biasing said knob towards said extended position, and said knob comprising cooperatively interengagable rotation control means; and
- a spool rotatively disposed within said head enclosure around said housing axis of rotation for storing a flexible trimmer line, wherein said spool comprises at least one flexible trimmer line storage chamber delimited by at least two flanges and a hollow cylindrical core, wherein said hollow cylindrical core includes a central bearing surface for holding said spool rotationally concentric to said housing axis of rotation, and wherein said spool including a thrust surface for holding said spool axially constrained within said head enclosure under the biasing force of said spring means wherein said spool comprising coupling means to rotatively engage said knob to said spool;
- wherein when said cutting head device is in a normal operation, said knob cooperatively interengagable rotation control means in cooperation with said lower cover cooperatively interengagable rotation control means locks said spool from rotation relative to said head enclosure for constraining said flexible trimmer line from extending outside said head enclosure peripheral apertures, and when said knob is shifted from said extended position to said retracted position and back to said extended position, segments of said flexible trimmer line are released outside said head enclosure, and when said cutting head device is in a condition to be refilled with a new flexible trimmer line, said knob cooperatively interengagable rotation control means in cooperation with said lower cover cooperatively interengagable rotation control means allow said knob to be manually rotated in one direction relative to said lower cover for winding said new flexible trimmer line into said spool, being the winding direction of rotation opposite to the spool rotational direction in which new segments of said new flexible trimmer line are released.

2. The cutting head device of claim 1, wherein said spool including a flexible trimmer line guide disposed within one of said two flanges, wherein said flexible trimmer line guide is comprised of three flexible trimmer line guide sections including two external flexible trimmer guide line sections and one inner flexible trimmer line guide section, crossing diametrically through said one of said two flanges, wherein said two external flexible trimmer line guide sections are diametrically opposed to each other and are radially extending from said hollow cylindrical core to the periphery of said one of said two flanges, and said inner flexible trimmer line guide section, diametrically crossing through said hollow cylindrical core and aligned in unobstructed communication with said two external flexible trimmer line guide sections, wherein said two external flexible trimmer line guide sections of said three flexible trimmer line guide sections having an open window disposed within said one of said two flanges.

3. The cutting head device of claim 1, wherein said spool including a flexible trimmer line guide disposed within one of said two flanges, wherein said flexible trimmer line guide is comprised of three flexible trimmer line guide sections including two external flexible trimmer line guide sections and one semi-circular inner flexible trimmer line guide section, wherein said two external flexible trimmer line guide sections are non-radially oriented and mirrored by a plane crossing through said housing axis of rotation while crossing through said one of said two flanges and said semi-circular inner flexible trimmer line guide section crossing through said hollow cylindrical core in a semi-circular path disposed over said spool thrust surface and tangentially in unobstructed communication with said two external flexible trimmer line guide sections, wherein said two external flexible trimmer line guide sections of said three flexible trimmer line guide sections having an open window disposed within said one of said two flanges, and an open window of said semi-circular inner flexible trimmer line guide section disposed over said spool thrust surface and wherein said spool thrust surface in cooperation with a threaded coupler thrust face for sealing said open window of said semi-circular inner flexible trimmer line guide section of said three flexible trimmer line guide sections open window for facilitating insertion of said flexible trimmer line through said spool hollow cylindrical core.

4. The cutting head device of claim 1, wherein said knob cooperatively interengagable rotation control means are comprised of a plurality of circumferentially spaced knob flange tabs projecting radially outwardly from a knob flange and a plurality of circumferentially spaced knob teeth or knob cam followers, projecting in a direction generally parallel and concentric to said housing axis of rotation, and wherein said lower cover cooperatively interengagable rotation control means are comprised of a plurality of circumferentially spaced lower cover retention blocks projecting radially inwardly from said lower cover cylindrical wall section and a plurality of circumferentially spaced lower cover teeth or lower cover cam followers projecting in a direction parallel and concentric to said housing axis of rotation around said lower cover central annular opening.

5. The cutting head device of claim 1, wherein said spool including two blind flexible trimmer line guides disposed within one of said two flanges, wherein each of said two blind flexible trimmer line guides is comprised of one external flexible trimmer line guide section and one semi-circular inner flexible trimmer line guide section, wherein said external flexible trimmer line guide sections are parallel to each other in a non-radial direction while crossing through said one of said two flanges and each of said semi-circular inner flexible trimmer line guide sections is disposed within said spool thrust surface tangentially and in unobstructed communication with each of said external flexible trimmer line guide sections, wherein each of said semi-circular inner flexible trimmer line guide sections having a shallow floor, and said each external flexible trimmer line guide section having an open window disposed within said one of said two flanges, and said each semi-circular inner flexible trimmer line guide section having an open window disposed over said spool thrust surface and wherein said spool thrust surface in cooperation with a threaded coupler thrust face to seal said open windows for compressing ends of said flexible trimmer line for retention within said spool hollow cylindrical core.

6. The cutting head device of claim 1, wherein said lower cover cooperatively interengagable rotation control means comprising lower cover projecting structures equally spaced angularly and said knob cooperatively interengagable rotation control means comprising knob projecting structures equally spaced angularly, wherein sequential engagement and disengagement of said lower cover projecting structures relative to said knob projecting structures, allows a predetermined rotation of said knob relative to said lower cover.

7. A cutting head device for a flexible trimmer line mowing machine comprising:
 a head enclosure having coupling means for axially and rotationally attaching said cutting head device to said flexible trimmer line mowing machine wherein said head enclosure comprising a housing and said coupling means comprising a thrust face;
 a lower cover releasable coupled to said housing comprised of a radial wall portion extending outwards from a central opening of the lower cover and a peripheral wall section extending vertically from the periphery of said radial wall portion, wherein said lower cover comprises cooperatively interengagable rotation control means;
 a spool rotationally disposed within said head enclosure around an axis of rotation for storing a predetermined amount of a flexible trimmer line, said spool comprised of a hollow cylindrical core, cylindrical flanges each radially extending from said hollow cylindrical core and a central cavity including a closed face, wherein said spool comprising a flexible trimmer line guide to insert a portion of a new flexible trimmer line throughout; and
 bumping means comprised of a radially extending wall, a peripheral wall portion, and a bumping surface, said bumping means rotationally engaged to said spool and said lower cover for releasing segments of the flexible trimmer line during operation and for manually winding the flexible trimmer line onto said spool, said bumping means rotationally and axially disposed within said lower cover central opening and comprising cooperatively interengagable rotation control means.

8. The cutting head device of claim 7, wherein said bumping means cooperatively interengagable rotation control means are comprised of a plurality of circumferentially spaced flange tabs projecting radially outwardly from said bumping means radially extending wall and a plurality of circumferentially spaced bumping means teeth or bumping means cam followers projecting in a direction generally parallel and concentric to said peripheral wall portion and wherein said lower cover cooperatively interengagable rotation control means are comprised of a plurality of circumferentially spaced lower cover retention blocks projecting radially inwardly from said lower cover peripheral wall section, separated from said radial wall portion for a gap, and a plurality of circumferentially spaced lower cover teeth or lower cover cam followers projecting in a direction generally parallel to said peripheral wall section and radially concentric to said lower cover central opening.

9. The cutting head device of claim 7, wherein said spool flexible trimmer line guide is disposed within one of said spool cylindrical flanges, wherein said spool flexible trimmer line guide is comprised of three flexible trimmer line guide sections including two external flexible trimmer line guide sections and an inner flexible trimmer line guide section, crossing diametrically through said one of said spool cylindrical flanges and said hollow cylindrical core, wherein said two external flexible trimmer line guide sections are diametrically opposed to each other and radially extending from said hollow cylindrical core to the periphery of said one of said cylindrical flanges, and said inner flexible trimmer line guide section diametrically crossing through said hollow cylindrical core in alignment and in unobstructed communication with said two external flexible trimmer line guide sections, wherein said two external flexible trimmer line guide sections of said three flexible trimmer line guide sections having an open window disposed within said one of said cylindrical flanges.

10. The cutting head device of claim 7, wherein said spool flexible trimmer line guide is disposed within one of said cylindrical flanges, wherein said spool flexible trimmer line guide is comprised of three flexible trimmer line guide sections including two external flexible trimmer line guide sections and a semi-circular inner flexible trimmer line section crossing through said one of said cylindrical flanges in a non-radial direction, wherein said two external flexible trimmer line guide sections are mirrored by a plane crossing through said spool axis of rotation and extending from said hollow cylindrical core to the periphery of said one of said cylindrical flanges, and said semi-circular inner flexible trimmer line guide section tangentially connected in an unobstructed communication to said two external flexible trimmer line guide sections within said central cavity closed face, wherein said two external flexible trimmer line guide sections having an open window within said one of said spool cylindrical flanges, and said semi-circular inner flexible trimmer line guide section having an open window within said spool central cavity closed face which is covered by said coupling means thrust face to facilitate the new flexible trimmer line insertion.

11. The cutting head device of claim 7, wherein said lower cover cooperatively interengagable rotation control means in cooperation with said bumping means cooperatively interengagable rotation control means allows manual unidirectional rotation of said bumping means relative to said lower cover by a biasing force of spring means wherein said unidirectional rotation is opposite to the spool direction of rotation while operating for externally winding said new flexible trimmer line onto said spool.

12. The cutting head device of claim 7, wherein said spool comprising a pair of blind flexible trimmer line guides disposed within one of said cylindrical flanges, wherein each of said pair of blind flexible trimmer line guides is comprised of two flexible trimmer line guide sections including an external flexible trimmer line guide section crossing through said one of said cylindrical flanges and a semi-circular inner flexible trimmer line guide section disposed within said hollow cylindrical core, wherein said external flexible trimmer line guide sections are mirrored by a plane crossing through said spool axis of rotation and extending from said hollow cylindrical core to the periphery of said one of said cylindrical flanges, and said semi-circular inner flexible trimmer line guide sections of said two flexible trimmer line guide sections being each tangentially connected in unobstructed communication to each of said external flexible trimmer line guide sections of and disposed within said hollow cylindrical core, wherein each of said external flexible trimmer line guide sections having an open window disposed within said one of said cylindrical flanges, and each of said semi-circular inner flexible trimmer line guide sections having an open window disposed within said hollow cylindrical core and being covered by said thrust face of said coupling means for maintaining the new flexible trimmer line constrained within each of said semi-circular inner flexible trimmer line guide sections, wherein said semi-circular inner flexible trimmer line guide sections having a shallow floor for compressing the ends of said flexible trimmer line between said coupling means thrust face and said semi-circular inner flexible trimmer line guide sections.

13. The cutting head device of claim 7, wherein said bumping means having an extended position and a retracted position, the shifting of said bumping means between said extended positions and said retracted position allows a controlled rotation of said bumping means relative to said lower cover for releasing controlled amounts of the flexible trimmer line.

14. The cutting head device of claim 7, wherein said lower cover cooperatively interengagable rotation control means comprising lower cover projecting structures equally spaced angularly and said bumping means cooperatively interengagable rotation control means comprising bumping means projecting structures equally spaced angularly, wherein sequential engagement and disengagement of said lower cover projecting structures relative to said bumping means projecting structures, allows a predetermined rotation of said bumping means relative to said lower cover.

15. A cutting head device for a flexible trimmer line mowing machine comprising:
head enclosure means for enclosing internal components of said cutting head device, said head enclosure means having an upper body, a lower cover and coupling means, said head enclosure means upper body being releasably coupled to said head enclosure means lower cover for gaining access to the interior of said head enclosure means;
spool means for storing a flexible trimmer line, rotationally disposed within aid head enclosure means around an axis of rotation, constrained from axial movement relative to said head enclosure means urged by spring means;
ground bumping means for controlled release of segments of said flexible trimmer line, protruding from a central opening of said head enclosure means lower cover, wherein said ground bumping means are rotationally engaged to said spool means for locking said spool means against relative rotation to said head enclosure means when said ground bumping means is in an extended position urged by said spring means and for permitting a first predetermined rotational increment of said spool means relative to said head enclosure means as said ground bumping means is moved from said extended position to a retracted position and a second predetermined rotational increment of said spool means rotation relative to said head enclosure means as said ground bumping means is moved from said retracted position back to said extended position; and
cooperatively interengagable rotation control means disposed onto said head enclosure means lower cover and onto said ground bumping means for controlled rotation of said spool means.

16. The cutting head device of claim 15, wherein said spool means comprising at least two cylindrical flanges and wherein one of said two cylindrical flanges comprises a flexible trimmer line guide, wherein said flexible trimmer line guide is comprised of three flexible trimmer line guide sections including two external flexible trimmer line guide sections and an inner flexible trimmer line guide section, crossing diametrically through said one of said two cylindrical flanges and a spool hollow cylindrical core, wherein said two external flexible trimmer line guide sections are diametrically opposed to each other and radially extending from said spool hollow cylindrical core to the periphery of said one of said two cylindrical flanges, and said inner flexible trimmer line guide section diametrically crossing through said spool hollow cylindrical core in alignment and in unobstructed communication with said two external flexible trimmer line guide sections, wherein said two external flexible trimmer line guide sections each having an open window disposed within said one of said two cylindrical flanges.

17. The cutting head device of claim 15, wherein said spool means comprising at least two cylindrical flanges where one of said flanges is radially extending from within a hollow cylindrical core and at least another of said flanges is extending from said hollow cylindrical core, wherein a flexible trimmer line guide is disposed within said one flange radially extending from within said hollow cylindrical core, wherein said flexible trimmer line guide is comprised of three flexible trimmer line guide sections including two external flexible trimmer line guide sections and a semi-circular inner flexible trimmer line guide section, crossing through said one flange radially extending from within said hollow cylindrical core in a non-radial direction, wherein said two external flexible trimmer line guide sections are mirrored by a plane crossing through said spool means axis of rotation and extending from said hollow cylindrical core to the periphery of aid one of said two flanges, and said semi-circular inner flexible trimmer line guide section of being tangentially connected in unobstructed communication to said two external flexible trimmer line guide sections and disposed within said hollow cylindrical core, wherein each of said two external flexible trimmer line guide sections of having an open window disposed within said flange radially extending from within said hollow cylindrical core, and said one semi-circular inner flexible trimmer line guide section having an open window disposed within said hollow cylindrical core and being covered by a thrust face of said coupling means for maintaining a replacement flexible trimmer line constrained within said semi-circular inner flexible trimmer line guide section.

18. The cutting head device of claim 15, wherein said spool means comprising at least two cylindrical flanges where one of said flanges is radially extending from within a hollow cylindrical core and at least another of said flanges is extending from said hollow cylindrical core, wherein said flange extending from said hollow cylindrical core comprising a pair of blind flexible trimmer line guides, wherein each of said pair of blind flexible trimmer line guides is comprised of two flexible trimmer line guide sections including an external flexible trimmer line guide section crossing through said one flange radially extending from within said hollow cylindrical core and a semi-circular inner flexible trimmer line guide section disposed within said hollow cylindrical core, wherein said external flexible trimmer line guide sections are mirrored by a plane crossing through said spool means axis of rotation and extending from said hollow cylindrical core to the periphery of said one flange radially extending from within said hollow cylindrical core, and said semi-circular inner flexible trimmer line guide sections being each tangentially connected in unobstructed communication to each of said external flexible trimmer line guide sections and disposed within said hollow cylindrical core, wherein each of said external flexible trimmer line guide sections having an open window disposed within said one flange radially extending from within said hollow cylindrical core, and each of said semi-circular inner flexible trimmer line guide sections having a shallow floor below an open window disposed within said hollow cylindrical core and being covered by a thrust face of said coupling means for maintaining ends of a new flexible trimmer line constrained within each of said semi-circular inner flexible trimmer line guide sections by compressing said flexible trimmer line ends between said coupling means thrust face and said semi-circular inner flexible trimmer line guide sections shallow floor.

19. The cutting head device of claim 15, wherein said ground bumping means cooperatively interengagable rotation control means are comprised of a plurality of circumferentially spaced flange tabs projecting radially outwardly from a ground bumping means cylindrical wall portion and a plurality of circumferentially spaced ground bumping means teeth or cam followers projecting in a direction generally parallel and concentric to said ground bumping means cylindrical wall portion, and wherein said lower cover cooperatively interengagable rotation control means are comprised of a plurality of circumferentially spaced lower cover retention blocks projecting radially inwardly from a lower cover cylindrical side wall portion including a gap and a plurality of circumferentially spaced lower cover teeth or cam followers projecting from a lower cover radial wall portion in a direction generally parallel and radially concentric to said lower cover cylindrical side wall portion.

20. The cutting head device of claim 15, wherein said lower cover cooperatively interengagable rotation control means in cooperation with said ground bumping means cooperatively interengagable rotation control means allow manual unidirectional rotation of said ground bumping means relative to said head enclosure means by biasing force of said spring means and wherein said unidirectional rotation being opposite to the rotation direction of the spool means during operation.

21. The cutting head device of claim 15, wherein said spool means comprising a central cavity including cylindrical walls for rotational support and a flat end face for axial constraining in cooperation with said coupling means.

* * * * *